US011637321B2

United States Patent
He et al.

(10) Patent No.: US 11,637,321 B2
(45) Date of Patent: Apr. 25, 2023

(54) TERNARY SALTS ELECTROLYTE FOR A PHOSPHO-OLIVINE POSITIVE ELECTRODE

(71) Applicant: GM GLOBAL TECHNOLOGY OPERATIONS LLC, Detroit, MI (US)

(72) Inventors: Meinan He, Madison Heights, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 17/158,742

(22) Filed: Jan. 26, 2021

(65) Prior Publication Data

US 2022/0246987 A1 Aug. 4, 2022

(51) Int. Cl.
| | |
|---|---|
| *H01M 10/00* | (2006.01) |
| *H01M 10/0568* | (2010.01) |
| *H01M 10/0569* | (2010.01) |
| *H01M 4/38* | (2006.01) |
| *H01M 4/58* | (2010.01) |
| *H01M 10/052* | (2010.01) |

(52) U.S. Cl.
CPC ....... *H01M 10/0568* (2013.01); *H01M 4/382* (2013.01); *H01M 4/5825* (2013.01); *H01M 10/052* (2013.01); *H01M 10/0569* (2013.01); *H01M 2300/0034* (2013.01); *H01M 2300/0037* (2013.01)

(58) Field of Classification Search
CPC ....... H01M 4/5825; H01M 2300/0037; H01M 10/0569; H01M 4/382; H01M 2300/0034; H01M 10/052; H01M 10/0568
See application file for complete search history.

(56) References Cited

U.S. PATENT DOCUMENTS

| | | |
|---|---|---|
| 8,974,946 B2 | 3/2015 | Cai et al. |
| 9,123,939 B2 | 9/2015 | Xiao et al. |

(Continued)

FOREIGN PATENT DOCUMENTS

| | | |
|---|---|---|
| CN | 114792838 A | 7/2022 |
| DE | 10 2021131181 A1 | 7/2022 |

OTHER PUBLICATIONS

Xiao, Xingcheng et al., U.S. Appl. No. 16/575,143, filed Sep. 18, 2019 entitled, "Additive To Ceramic Ion Conducting Material To Mitigate the Resistive Effect of Surface Carbonates and Hydroxides," 51 pages.

(Continued)

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An electrochemical cell according to various aspects of the present disclosure includes a positive electrode, a negative electrode, a separator, and an electrolyte. The positive electrode includes a positive electroactive material. The positive electroactive material includes a phospho-olivine compound. The negative electrode includes lithium metal. The separator is between the positive electrode and the negative electrode. The separator is electrically insulating and ionically conductive. The electrolyte includes a ternary salt and a solvent. The ternary salt includes $LiPF_6$, LiFSI, and $LiClO_4$.

20 Claims, 14 Drawing Sheets

(56) References Cited

U.S. PATENT DOCUMENTS

| | | | |
|---|---|---|---|
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,537,144 B2 | 1/2017 | Huang et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 11,094,996 B2 | 8/2021 | Xiao et al. |
| 11,404,698 B2 | 8/2022 | Xu et al. |
| 2013/0323607 A1* | 12/2013 | Issaev | H01M 10/0567 429/338 |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2019/0341615 A1 | 11/2019 | Xiao et al. |
| 2019/0372155 A1 | 12/2019 | Yersak et al. |
| 2019/0393549 A1 | 12/2019 | Yersak et al. |
| 2020/0052338 A1 | 2/2020 | Liu et al. |
| 2020/0127282 A1 | 4/2020 | Yersak et al. |
| 2020/0395630 A1 | 12/2020 | Yersak et al. |
| 2022/0115715 A1* | 4/2022 | Kovalev | H01M 10/052 |

OTHER PUBLICATIONS

Xu, Jiagang et al, U.S. Appl. No. 16/668,904, filed Oct. 30, 2019 entitled, "Liquid Metal Interfacial Layers for Solid Electrolytes and Methods Thereof," 44 pages.

* cited by examiner

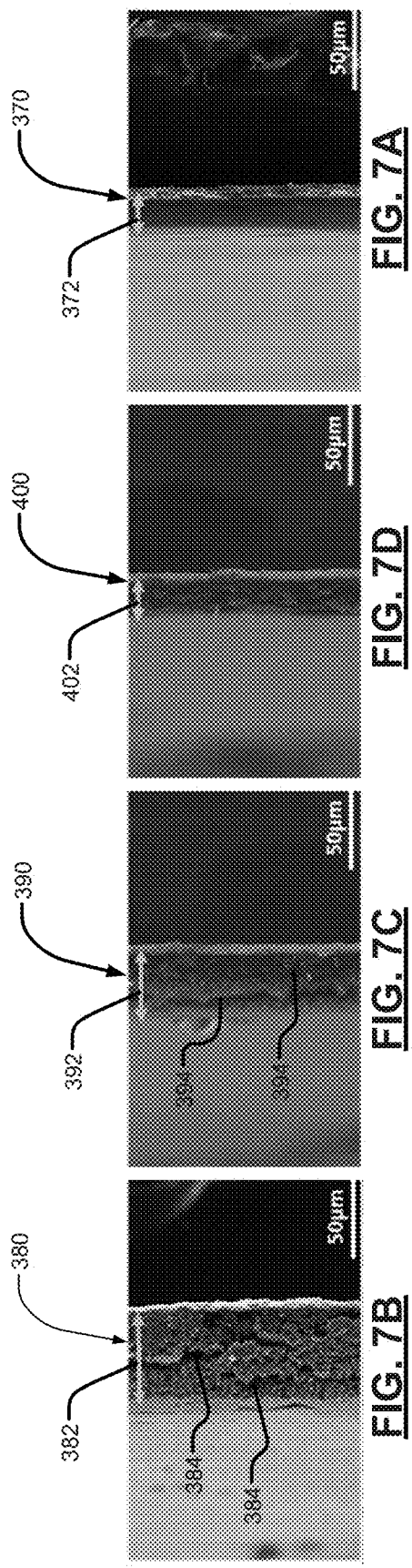

TERNARY SALTS ELECTROLYTE FOR A PHOSPHO-OLIVINE POSITIVE ELECTRODE

INTRODUCTION

This section provides background information related to the present disclosure which is not necessarily prior art.

The present disclosure relates to ternary salts electrolyte for a phospho-olivine positive electrode for an electrochemical cell and electrochemical cells including the ternary salts electrolyte.

High-energy density electrochemical cells, such as lithium-ion batteries can be used in a variety of consumer products and vehicles, such as battery or hybrid electric vehicles. Battery powered vehicles show promise as a transportation option as technical advances continue to be made in battery power and lifetimes.

SUMMARY

This section provides a general summary of the disclosure, and is not a comprehensive disclosure of its full scope or all of its features.

In various aspects, the present disclosure provides an electrochemical cell. The electrochemical cell includes a positive electrode, a negative electrode, a separator, and an electrolyte. The positive electrode includes a positive electroactive material. The positive electroactive material includes a phospho-olivine compound. The negative electrode includes lithium metal. The separator is between the positive electrode and the negative electrode. The separator is electrically insulating and ionically conductive. The electrolyte includes a ternary salt and a solvent. The ternary salt includes $LiPF_6$, LiFSI, and $LiClO_4$.

In one aspects, a total molarity of the ternary salt in the solvent is greater than or equal to about 0.5M to less than or equal to about 2M.

In one aspect, the total molarity is greater than or equal to 0.8M to less than or equal to about 1.2M.

In one aspect, a molarity of the $LiClO_4$ in the solvent is greater than or equal to about 0.1M to less than or equal to about 0.2M.

In one aspect, a molarity of the $LiPF_6$ in the solvent is greater than or equal to about 0.1M to less than or equal to about 1.4M.

In one aspect, a molarity of the LiFSI is greater than or equal to about 0.1M to less than or equal to about 1.4M.

In one aspect, a total molarity of the ternary salt in the solvent is greater than or equal to about 0.5M to less than or equal to about 2M. A first molarity of the $LiClO_4$ in the solvent is greater than or equal to about 0.1M to less than or equal to about 0.2M. A second molarity of the $LiPF_6$ in the solvent is greater than or equal to about 0.1M to less than or equal to about 1.4M. A third molarity of the LiFSI is greater than or equal to about 0.1M to less than or equal to about 1.4M.

In one aspect, the solvent includes a fluorinated cyclic carbonate.

In one aspect, the fluorinated cyclic carbonate is selected from the group consisting of: fluoroethylene carbonate (FEC), difluoroethylene carbonate (DFEC), trifluoropropylene carbonate (TFPC), or any combination thereof.

In one aspect, the solvent further includes a linear carbonate.

In one aspect, the linear carbonate is selected from the group consisting of: dimethyl carbonate (DMC), diethyl carbonate (DEC), ethyl methyl carbonate (EMC), or any combination thereof.

In one aspect, the fluorinated cyclic carbonate includes fluoroethylene carbonate (FEC) and the linear carbonate includes dimethyl carbonate (DMC).

In one aspect, the solvent includes the fluorinated cyclic carbonate and the linear carbonate at a volume ratio of greater than or equal to about 1:9 to less than or equal to about 9:1.

In one aspect, the volume ratio is about 1:4 fluorinated cyclic carbonate to linear carbonate.

In one aspect, the phospho-olivine compound has a form of $Li-M^1-M^1-M^2-PO_4$. $M^1$ is a first transition metal. $M^2$ is a second transition metal.

In one aspect, the phospho-olivine compound includes LMFP.

In one aspect, the phospho-olivine compound is a first positive electroactive material and the positive electrode further includes a second electroactive material different from the first positive electroactive material.

In one aspect, the second electroactive material is selected from the group consisting of: a rock salt layered oxide, a spinel, or both the rock salt layered oxide and the spine.

In one aspect, the positive electrode further includes an electrically-conductive material.

In various aspects, the present disclosure provides an electrolyte system including a solvent and a ternary salt. The solvent includes a fluorinated cyclic carbonate and a linear carbonate. The ternary salt is in the solvent at a total molarity of greater than or equal to about 0.5M to less than or equal to about 2M. The ternary salt includes $LiClO_4$ at a first molarity of greater than or equal to about 0.1M to less than or equal to about 0.2M, $LiPF_6$ at a second molarity of greater than or equal to about 0.1M to less than or equal to about 1.4M, and LiFSI at a third molarity of greater than or equal to about 0.1M to less than or equal to about 1.4M.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 4A is a graph depicting area-specific resistance as a function of state of charge (SOC); FIG. 4B is a graph depicting charge and discharge voltage profiles for an electrochemical cell including the phospho-olivine-based positive electrode; and FIG. 4C is a graph depicting charge and discharge voltage profiles for an electrochemical cell including the nickel-based positive electrode;

FIG. 5A is a graph depicting a relationship between temperature and conductivity of the electrolyte; FIG. 5B is a graph depicting capacity retention for LMFP- and NMC 622-based positive electrodes and lithium metal negative electrodes in the electrolyte; FIG. 5C is a graph depicting charge and discharge voltage profiles for an electrochemical cell including an LMFP-based positive electrode, a lithium metal anode, and the electrolyte.

FIG. 6A is a graph depicting a relationship between temperature and conductivity of the electrolyte; FIG. 6B is a graph depicting capacity retention for LMFP- and NMC 622-based positive electrodes and lithium metal negative electrodes in the electrolyte; FIG. 6C is a graph depicting an electrochemical cell including an LMFP-based positive electrode, a lithium metal negative electrode, and the electrolyte; and FIG. 6D is a graph depicting charge and discharge voltage profiles for an electrochemical cell including an NMC 622-based positive electrode, a lithium metal anode, and the electrolyte;

FIGS. 7A-7D are scanning electron microscope (SEM) images related to harvest lithium metal morphology of LMFP/lithium metal half-cells according to various aspects of the present disclosure; FIG. 7A is a sectional view of a pristine lithium metal electrode in a half-cell; FIG. 7B is a sectional view of a lithium metal electrode in a half-cell that includes a LiFSI electrolyte; FIG. 7C is a sectional view of a lithium metal electrode in a half-cell that includes a $LiPF_6$ electrolyte; and FIG. 7D is a sectional view of a lithium metal electrode in a half-cell that includes a $LiClO_4$;

FIG. 9A is a graph depicting conductivity as a function of temperature for each of three salts; and FIG. 9B is a graphical representation of conductivity of the ternary salts electrolyte.

Corresponding reference numerals indicate corresponding parts throughout the several views of the drawings.

DETAILED DESCRIPTION

Figure 1:
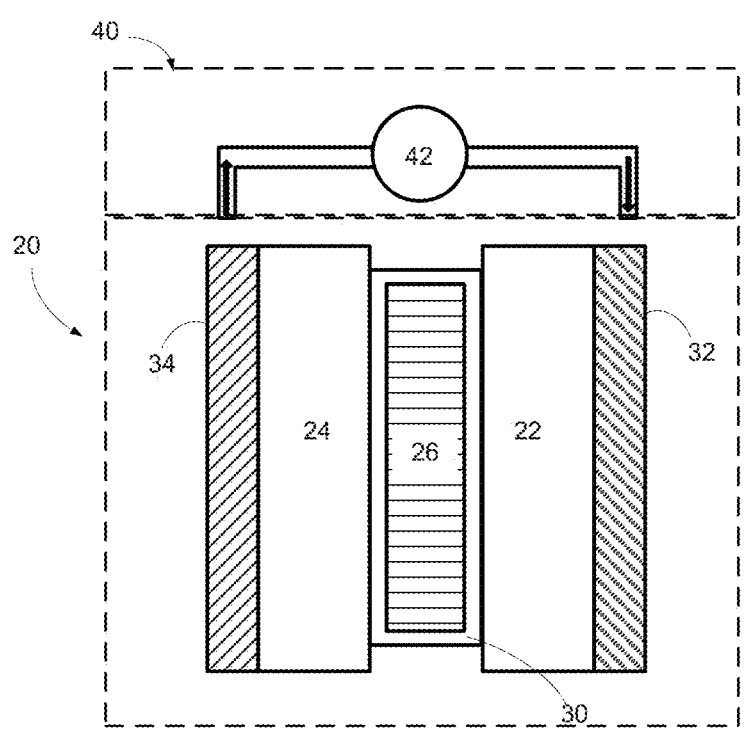
FIG. 1 is a schematic illustration of an electrochemical cell for cycling lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium-ion batteries, which may be used in vehicle applications. However, the present technology may also be used in other electrochemical devices that cycle lithium ions, such as handheld electronic devices or energy storage systems (ESS). A rechargeable lithium-ion battery is provided that may exhibit high energy density, low capacity fade, and high Coulombic efficiency.

General Electrochemical Cell Function, Structure, and Composition

A typical electrochemical cell includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery, and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

An exemplary schematic illustration of a lithium-ion battery 20 is shown in FIG. 1. The lithium-ion battery 20 includes a negative electrode 22, a positive electrode 24, and a porous separator 26 (e.g., a microporous or nanoporous polymeric separator) disposed between the negative and positive electrodes 22, 24. An electrolyte 30 is disposed between the negative and positive electrodes 22, 24 and in pores of the porous separator 26. The electrolyte 30 may also be present in the negative electrode 22 and positive electrode 24, such as in pores.

A negative electrode current collector 32 may be positioned at or near the negative electrode 22. A positive electrode current collector 34 may be positioned at or near the positive electrode 24. While not shown, the negative electrode current collector 32 and the positive electrode current collector 34 may be coated on one or both sides, as is known in the art. In certain aspects, the current collectors may be coated with an electroactive material/electrode layer on both sides. The negative electrode current collector 32 and positive electrode current collector 34 respectively collect and move free electrons to and from an external circuit 40. The interruptible external circuit 40 includes a load device 42 connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Electrolytes are generally in solid, liquid, or gel form, and are capable of conducting lithium ions between the negative electrode 22 and the positive electrode 24 may be used in the lithium-ion battery 20. In certain aspects, the electrolyte 30 may be a non-aqueous liquid electrolyte solution that includes one or more lithium salts dissolved in an organic solvent or a mixture of organic solvents. In certain variations, the electrolyte 30 may include an aqueous solvent (i.e., a water-based solvent) or a hybrid solvent (e.g., an organic solvent including at least 1% water by weight). Appropriate lithium salts generally have inert anions.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD 2500 (a monolayer polypropylene separator) and CELGARD 2340 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN (Hoechst AG, Germany) and ZENITE (DuPont, Wilmington, Del.)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

Positive Electrode

Positive electrodes 24 may generally be formed from or include a lithium-based active material that can undergo lithium intercalation and deintercalation, alloying and dealloying, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co).

The positive electroactive materials may be powder compositions. The positive electroactive materials may be intermingled with an optional electrically conductive material (e.g., electrically-conductive particles) and a polymeric binder. The binder may both hold together the positive electroactive material and provide ionic conductivity to the positive electrode 24. The polymeric binder may include polyvinylidene fluoride (PVdF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxies, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium polyacrylate (NaPAA), sodium alginate, lithium alginate, or a combination thereof.

The positive electroactive material loading in the binder can be large, such as greater than about 80% by weight. For example, the binder can be present at a level of greater than or equal to about 1% by weight to less than or equal to about 20% by weight, optionally greater than or equal to about 1% by weight to less than or equal to about 10% by weight, optionally greater than or equal to about 1% to less than or equal to about 8% by weight, optionally greater than or equal to about 1% by weight to less than or equal to about 6% by weight, optionally greater than or equal to about 1% by weight to less than or equal to about 7% by weight, optionally greater than or equal to about 1% by weight to less than or equal to about 5% by weight, or optionally greater than or equal to about 1% by weight to less than or equal to about 3% by weight.

Electrically conductive materials may include graphite, other carbon-based materials, conductive metals, or conductive polymer particles. Carbon-based materials may include, by way of example, particles of KETJEN black, DENKA black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15% by weight, optionally less than or equal to about 10% by weight, or optionally greater than or equal to about 0.5% by weight to less than or equal to about 8% by weight. While the supplemental electrically conductive compositions may be described as powders, these materials lose their powder character following incorporation into the electrode where the associated particles of the supplemental electrically conductive material become a component of the resulting electrode structure.

Negative Electrode

The negative electrode 22 may include a negative electroactive material as a lithium host material capable of functioning as a negative terminal of the lithium-ion battery 20. Common negative electroactive materials include lithium insertion materials or alloy host materials or plating and stripping materials. Such materials can include carbon-based materials, such as lithium-graphite intercalation compounds, lithium-silicon compounds, lithium-tin alloys, or lithium titanate $Li_{4+x}Ti_5O_{12}$, where $0 \leq x \leq 3$, such as $Li_4Ti_5O_{12}$ (LTO).

In certain aspects, the negative electrode 22 may include lithium, and in certain variations metallic lithium and the lithium-ion battery 20. The negative electrode 22 may be a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically conductive material, as well as one or more polymeric binder materials to structurally hold the lithium material together. For example, in one embodiment, the negative electrode 22 may include an active material including lithium-metal particles intermingled with a binder material selected from the group consisting of: polyvinylidene difluoride (PVdF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, or a combination thereof. Suitable additional electrically conductive materials may include carbon-based material or a conductive polymer. Carbon-based materials may include by way of example, particles of KETJEN black, DENKA black, acetylene black, carbon black, and the like. Examples of a conductive polymer include polyaniline, polythiophene, polyacetylene, polypyrrole, and the like. In certain aspects, mixtures of conductive materials may be used. The negative electrode 22 may include about 50-100% by weight of an electroactive material (e.g., lithium particles or a lithium foil), optionally greater than or equal to about 30% by weight of an electrically conductive material, and a balance binder.

Electrode Fabrication

In various aspects, the negative and positive electrodes 22, 24 may be fabricated by mixing the respective electroactive material into a slurry with a polymeric binder compound, a non-aqueous solvent, optionally a plasticizer, and optionally if necessary, electrically conductive particles. The slurry can be mixed or agitated, and then thinly applied to a substrate via a doctor blade and/or slot die coating. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calender it. In other variations, the film may be dried at moderate temperature to form self-supporting films. If the substrate is removable, then it is removed from the electrode film that is then further laminated to a current collector. With either type of substrate, the remaining plasticizer may be extracted prior to incorporation into the battery cell. In various aspects, a solid electrode may be formed according to alternative fabrication methods.

Optional Electrode Surface Coatings

In certain variations, pre-fabricated negative electrodes 22 and positive electrodes 24 formed via the active material slurry casting described above can be directly coated via a vapor coating formation process to form a conformal inorganic-organic composite surface coating, as described further below. Thus, one or more exposed regions of the pre-fabricated negative electrodes including the electroactive material can be coated to minimize or prevent reaction of the electrode materials with components within the electrochemical cell to minimize or prevent lithium metal dendrite formation on the surfaces of negative electrode materials when incorporated into the electrochemical cell. In other variations, a plurality of particles including an electroactive material, like lithium metal, can be coated with an inorganic-organic composite surface coating. Then, the coated electroactive particles can be used in the active material slurry to form the negative electrode, as described above.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electrode material is placed within the metal grid. By way of example, electrically-conductive materials include copper, nickel, aluminum, stainless steel, titanium, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Electrochemical Cells Having Phospho-Olivine Positive Electrodes and Ternary Salts Electrolytes In various aspects, the present disclosure provides a ternary salts electrolyte system for an electrochemical cell. The ternary salts electrolyte system includes a solvent and ternary salts including $LiPF_6$, LiFSI, and $LiClO_4$. In certain aspects, the present disclosure provides an electrochemical cell including the electrolyte. The electrochemical cell may include a positive electrode including a phospho-olivine compound and a negative electrode including lithium metal. The electrochemical cell may have an extended cycle life and improved fast charge capabilities compared to lithium metal cells having other positive electroactive material and/or electrolyte compositions.

Figure 2:
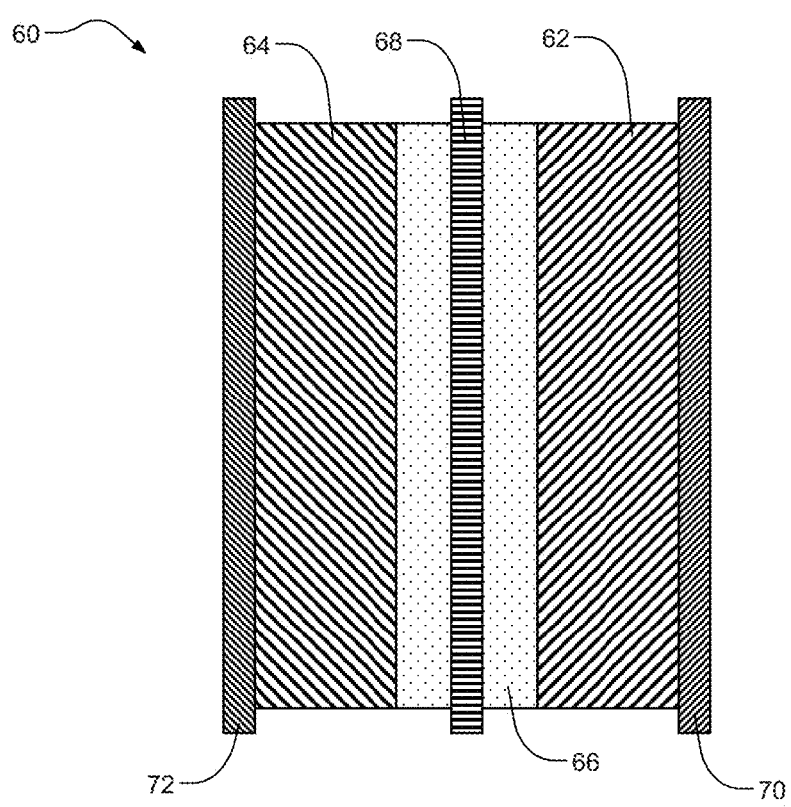
FIG. 2 is a schematic illustration of an electrochemical cell including a lithium metal negative electrode, a phospho-olivine positive electrode, and a ternary salts electrolyte according to various aspects of the present disclosure.

Referring to FIG. 2, an electrochemical cell 60 according to various aspects of the present disclosure is provided. The electrochemical cell 60 includes a negative electrode 62, a positive electrode 64, and a ternary salts electrolyte 66. A separator 68 is disposed between the negative and positive electrodes 62, 64. The electrochemical cell 60 further includes a negative electrode current collector 70 associated with the negative electrode 62 and a positive electrode current collector associated 72 with the positive electrode 64.

Positive Electrode

The positive electrode 64 includes a positive electroactive material, a binder, and optionally an electrically-conductive material. The electroactive material may be present in the positive electrode 64 at greater than or equal to about 5 weight percent to less than or equal to about 95 weight percent. In certain aspects, the electroactive material may be present at greater than or equal to about 5 weight percent, optionally greater than or equal to about 10, optionally greater than or equal to about 20 weight percent, optionally greater than or equal to about 30 weight percent, optionally greater than or equal to about 40 weight percent, optionally greater than or equal to about 50 weight percent, optionally greater than or equal to about 60 weight percent, optionally greater than or equal to about 70 weight percent, optionally greater than or equal to about 80 weight percent, or optionally greater than or equal to about 90 weight percent. In certain aspects, the electroactive material may be present at less than or equal to about 95 weight percent, optionally less than or equal to about 90 weight percent, optionally less than or equal to about 80 weight percent, optionally less than or equal to about 70 weight percent, optionally less than or equal to about 60 weight percent, optionally less than or equal to about 50 weight percent, optionally less than or equal to about 40 weight percent, optionally less than or equal to about 30 weight percent, optionally less than or equal to about 20 weight percent, or optionally less than or equal to about 10 weight percent.

The binder may be present in the positive electrode 64 at greater than or equal to about 1 to less than or equal to about 10 weight percent, such as greater than or equal to about 1 to less than or equal to about 3 weight percent, greater than or equal to about 3 to less than or equal to about 5 weight percent, or greater than or equal to about 5 to less than or equal to about 10 weight percent, by way of example. The conductive material may be present in the positive electrode 64 at greater than or equal to about 1 to less than or equal to about 10 weight percent, such as greater than or equal to about 1 to less than or equal to about 3 weight percent, greater than or equal to about 3 to less than or equal to about 5 weight percent, or greater than or equal to about 5 to less than or equal to about 10 weight percent, by way of example.

The electroactive material includes a phospho-olivine compound. The phospho-olivine compound may have the form of Li-M$^1$-M$^2$-PO$_4$, where M$^1$ is a first transition metal and M$^2$ is a second transition metal. In certain aspects, the phospho-olivine compound includes LiFe$_x$M$_{1-x}$PO$_4$, where M is a transition metal and 0<x<1 For example, the phospho-olivine compound may include a lithium manganese iron phosphate (LMFP), such as LiMn$_x$Fe$_{1-x}$PO$_4$, where 0<x<1. Examples of LiMn$_x$Fe$_{1-x}$PO$_4$ where 0<x<1 include LiMn$_{0.7}$Fe$_{0.3}$PO$_4$, LiMn$_{0.6}$Fe$_{0.4}$PO$_4$, LiMn$_{0.8}$Fe$_{0.2}$PO$_4$, and LiMn$_{0.75}$Fe$_{0.25}$PO$_4$, by way of example. In certain aspects, the phospho-olivine compound may have a dense crystal structure compared to other positive electroactive materials, such as nickel-based materials. The dense crystal structure may facilitate thermal stability and capacity stability (see, e.g., Example 1).

In certain aspects, the electroactive material further includes a secondary electroactive material. The secondary electroactive material may be present at less than or equal to about 90 weight percent of the total electroactive material, optionally less than or equal to about 80 weight percent of the total electroactive material, optionally less than or equal to about 70 weight percent of the total electroactive material, optionally less than or equal to about 60 weight percent of the total electroactive material, optionally less than or equal to about 50 weight percent of the total electroactive material, optionally less than or equal to about 40 weight percent of the total electroactive material, optionally less than or equal to about 30 weight percent of the total electroactive material, optionally less than or equal to about 20 weight percent of the total electroactive material, optionally less than or equal to about 10 weight percent of the total electroactive material, or optionally less than or equal to about 5 weight percent of the total electroactive material, by way of example. The secondary electroactive material may include a rock salt layered oxide, a spinel, or both the rock salt layered oxide and the spinel, by way of example. The rock salt layered oxide may include LiNi$_x$Mn$_y$Co$_{1-x-y}$O$_2$, LiNi$_x$Mn$_{1-x}$O$_2$, Li$_{1+x}$MO$_2$, (e.g., LiCoO$_2$, LiNiO$_2$, LiMnO$_2$, and/or LiNi$_{0.5}$Mn$_{0.5}$O$_2$), a lithium nickel manganese cobalt oxide (NMC) (e.g., NMC 111, NMC 523, NMC 622, NMC 721, and/or NMC 811), and/or a lithium nickel cobalt aluminum oxide (NCA)), by way of example. The spinel may include LiMn$_2$O$_4$ and/or LiNi$_{0.5}$Mn$_{1.5}$O$_4$, by way of example. In certain aspects, the electroactive material consists essentially of the phospho-olivine compound(s) and is free of a secondary electroactive material.

The binder may include polyvinylidene fluoride (PVDF), polytetrafluoroethylene (PTFE), polyacrylic acid (PAA), styrene-butadiene rubber (SBR), or any combination thereof. The electrically conductive material may include graphite, other carbon-based materials, conductive metals, conductive polymer particles, or any combination thereof. Carbon-based materials may include, by way of example, particles of KETJEN black, DENKA black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically-conductive materials may be used in the positive electrode 64.

Negative Electrode

In certain aspects, the negative electrode 62 includes lithium metal. The lithium metal may be in the form of a lithium foil or a lithium film. In certain aspects, the negative electrode 62 including lithium metal may have 100% active material loading. The negative electrode 62 including lithium metal may, in certain aspects, consist essentially of lithium metal. In certain aspects, the negative electrode 62 including lithium metal may have a thickness of greater than or equal to about 5 μm to less than or equal to about 500 μm, such as greater than or equal to about 5 μm to less than or equal to about 50 μm, greater than or equal to about 50 μm to less than or equal to about 100 μm, greater than or equal to about 100 μm to less than or equal to about 250 μm, or greater than or equal to about 250 μm to less than or equal to about 500 μm, by way of example.

Current Collectors

In certain aspects, the negative electrode current collector 70 may include copper, by way of example. In certain aspects, the positive electrode current collector 72 may include aluminum, by way of example.

Ternary Salts Electrolyte

The ternary salts electrolyte 66 is disposed between the negative and positive electrodes 62, 64, within the negative and/or positive electrodes 62, 64, and/or within the separator 68. The ternary salts electrolyte 66 includes a solvent and a ternary salt. The ternary salt includes lithium fluorosulfonylimide (LiN(FSO$_2$)$_2$) (LIFSI), lithium hexafluorophosphate (LiPF$_6$), and lithium perchlorate (LiClO$_4$). In certain aspects, the ternary salt consists essentially of LiFSI, LiPF$_6$, and LiClO$_4$ and is free of other salts.

The composition of the ternary salts electrolyte 66 may be tailored based on a desired performance of the electrochemical cell. In certain aspects, LiFSI may facilitate increased lithium metal stability and increased conductivity. In certain aspects, LiPF$_6$ may facilitate increase conductivity and increased capacity retention. In certain aspects, LiClO$_4$ may facilitate increased thermal stability and acceptable harvest morphology, which correspond to increased lithium metal stability.

In certain aspects, a molarity of the LiFSI in the solvent is greater than or equal to about 0.1M to less than or equal to about 1.4M, optionally greater than or equal to about 0.3M to less than or equal to about 0.7M, optionally greater than or equal to about 0.4M to less than or equal to about 0.6M, or optionally about 0.5M. In certain aspects, the molarity of the LiFSI in the solvent is greater than or equal to 0.1M, optionally greater than or equal to 0.2M, greater than or equal to 0.3M, optionally greater than or equal to 0.4M, optionally greater than or equal to 0.5M, optionally greater than or equal to 0.6M, optionally greater than or equal to 0.7M, optionally greater than or equal to 0.8M, optionally greater than or equal to 0.9M, optionally greater than or equal to 1M, optionally greater than or equal to 1.1M, optionally greater than or equal to 1.2M, optionally greater than or equal to 1.3M. In certain aspects, the molarity of the LiFSI in the solvent is less than or equal to about 1.4M, optionally less than or equal to about 1.3M, optionally less than or equal to about 1.2M, optionally less than or equal to about 1.1M, optionally less than or equal to about 1M, optionally less than or equal to about 0.9M, optionally less than or equal to about 0.8M, optionally less than or equal to about 0.7M, optionally less than or equal to about 0.6M, optionally less than or equal to about 0.5M, optionally less than or equal to about 0.4M, optionally less than or equal to about 0.3M, or optionally less than or equal to about 0.2M. By way of example, the molarity of the LiFSI in the solvent may be greater than or equal to about 0.1M to less than or equal to about 0.5M, greater than or equal to about 0.5M to less than or equal to about 1M, or greater than or equal to about 1M to less than or equal to about 1.4M.

In certain aspects, a molarity of the $LiPF_6$ in the solvent is greater than or equal to about 0.1M to less than or equal to about 1.4M, optionally greater than or equal to about 0.1M to less than or equal to about 0.5M, optionally greater than or equal to about 0.2M to less than or equal to about 0.4M, or optionally about 0.3M. In certain aspects, the molarity the $LiPF_6$ in the solvent is greater than or equal to 0.1M, optionally greater than or equal to 0.2M, optionally greater than or equal to 0.3M, optionally greater than or equal to 0.4M, optionally greater than or equal to 0.5M, optionally greater than or equal to 0.6M, optionally greater than or equal to 0.7M, optionally greater than or equal to 0.8M, optionally greater than or equal to 0.9M, optionally greater than or equal to 1M, optionally greater than or equal to 1.1M, optionally greater than or equal to 1.2M, optionally greater than or equal to 1.3M. In certain aspects, the molarity the $LiPF_6$ in the solvent is less than or equal to about 1.4M, optionally less than or equal to about 1.3M, optionally less than or equal to about 1.2M, optionally less than or equal to about 1.1M, optionally less than or equal to about 1M, optionally less than or equal to about 0.9M, optionally less than or equal to about 0.8M, optionally less than or equal to about 0.7M, optionally less than or equal to about 0.6M, optionally less than or equal to about 0.5M, optionally less than or equal to about 0.4M, optionally less than or equal to about 0.3M, or optionally less than or equal to about 0.2M. By way of example, the molarity the $LiPF_6$ in the solvent may be greater than or equal to about 0.1M to less than or equal to about 0.5M, greater than or equal to about 0.5M to less than or equal to about 1M, or greater than or equal to about 1M to less than or equal to about 1.4M.

In certain aspects, a molarity of the $LiClO_4$ in the solvent is greater than or equal to about 0.1M to less than or equal to about 0.2M or optionally greater than or equal to about 0.15M to less than or equal to about 0.2M. In certain aspects, the molarity the $LiClO_4$ in the solvent is greater than or equal to 0.1M, optionally greater than or equal to 0.12M, optionally greater than or equal to 0.13M, optionally greater than or equal to 0.14M, optionally greater than or equal to 0.15M, optionally greater than or equal to 0.16M, optionally greater than or equal to 0.17M, optionally greater than or equal to 0.18M, or optionally greater than or equal to 0.19M. In certain aspects, the molarity the $LiClO_4$ in the solvent is less than or equal to about 0.2M, optionally less than or equal to about 0.19M, optionally less than or equal to about 0.18M, optionally less than or equal to about 0.17M, optionally less than or equal to about 0.16M, optionally less than or equal to about 0.15M, optionally less than or equal to about 0.14M, optionally less than or equal to about 0.13M, optionally less than or equal to about 0.12M, or optionally less than or equal to about 0.11M. By way of example, the molarity the $LiClO_4$ in the solvent may be greater than or equal to about 0.1M to less than or equal to about 0.13M, greater than or equal to about 0.13M to less than or equal to about 0.17M, or greater than or equal to about 0.17M to less than or equal to about 0.2M.

A total molarity of the ternary salt (e.g., a sum of the molarities of LiFSI, $LiPF_6$, and $LiClO_4$) in the solvent mat be greater than or equal to 0.5M to less than or equal to about 2M, or optionally greater than or equal to 0.75M to less than or equal to about 1.75M, or optionally greater than or equal to about 0.8M to less than or equal to about 1.2M. For example, the molarity may be greater than or equal to 0.5M to less than or equal to about 0.75M, greater than or equal to 0.75M to less than or equal to about 1M, greater than or equal to 1M to less than or equal to about 1.25M, greater than or equal to 1.25M to less than or equal to about 1.5M, greater than or equal to 1.5M to less than or equal to about 1.75M, or greater than or equal to 1.75M to less than or equal to about 2M. Example compositions are shown below in Table 1.

TABLE 1

| LiFSI (M) | $LiPF_6$ (M) | $LiClO_4$ (M) | Total (M) |
| --- | --- | --- | --- |
| 0.2 | 0.8 | 0.2 | 1.2 |
| 0.4 | 0.6 | 0.2 | 1.2 |
| 0.5 | 0.3 | 0.2 | 1.0 |
| 0.6 | 0.4 | 0.2 | 1.2 |
| 0.8 | 0.2 | 0.2 | 1.2 |

The solvent may include a fluorinated cyclic carbonate, a linear carbonate, or both the fluorinated cyclic carbonate and the linear carbonate. The fluorinated cyclic carbonate may be selected from the group consisting of: fluoroethylene carbonate (FEC), difluoroethylene carbonate (DFEC), trifluoropropylene carbonate (TFPC), or any combination thereof. In certain aspects, the fluorinated cyclic carbonate may be a solid electrolyte interphase (SEI) former. The linear carbonate may be selected from the group consisting of: dimethyl carbonate (DMC), diethyl carbonate (DEC), ethyl methyl carbonate (EMC), or any combination thereof.

In certain aspects, the solvent includes both the fluorinated cyclic carbonate and the linear carbonate at a volume ratio (fluorinated cyclic carbonate to linear carbonate) of greater than or equal to about 1:9 to less than or equal to about 9:1, optionally greater than or equal to about 1:9 to less than or equal to about 1:1, greater than or equal to about 1:6 to less than or equal to about 1:2, or optionally about 1:4. By way of example, the volume ratio may be greater than or equal to about 1:9 to less than or equal to about 1:5, greater than or equal to about 1:5 to less than or equal to about 1:2, greater than or equal to about 1:2 to less than or equal to about 1:1, greater than or equal to about 1:1 to less than or equal to about 2:1, greater than or equal to about 2:1 to less than or equal to about 5:1, or greater than or equal to about 5:1 to less than or equal to about 9:1. In one example, the volume ratio is 1:4 fluorinated cyclic carbonate to linear carbonate, such as 1:4 FEC:DMC.

Separator

The separator 68 is ionically conductive and electrically insulating. In certain aspects, the separator 68 is similar or identical to the porous separator 26 of FIG. 1, described above.

Example 1

Capacity Stability with LMFP Electrode

Two electrochemical cells are prepared. A first electrochemical cell includes a first positive electrode, a first negative electrode, and a first binder. The first positive electrode includes a phospho-olivine electroactive material. The first positive electrode includes 95 weight percent of LMFP as the phospho-olivine electroactive material, 2.5 weight percent carbon as a conductive additive, and 2.5 weight percent of PVDF as a binder. The first positive electrode has a density of about 2.5 g/cm$^3$ and a loading of about 4.5 mAh/cm$^2$. The first negative electrode includes graphite with a density of about 2.5 g/cm$^3$ and a loading of about 4.5 mAh/cm$^2$. The first electrolyte includes 1.2M LiPF$_6$ in a solvent including ethylene carbonate (EC), EMC, and propylene carbonate (PC), and a vinylene carbonate (VC) additive.

A second or comparative electrochemical cell includes a second positive electrode, a second negative electrode, and a second electrolyte. The second positive electrode includes a nickel-based electroactive material. The second positive electrode includes 96 weight percent NMC 622 as the nickel-based electroactive material, 2 weight percent carbon as a conductive additive, and 2 weight percent of PVDF as a binder. The second positive electrode has a density of about 2.5 g/cm$^3$ and a loading of about 4.5 mAh/cm$^2$. The second negative electrode includes graphite with a density of about 2.5 g/cm$^3$ and a loading of about 4.5 mAh/cm$^2$. The second electrolyte includes 1.2M LiPF$_6$ in a solvent including EC and EMC, and a VC additive.

Figure 3:
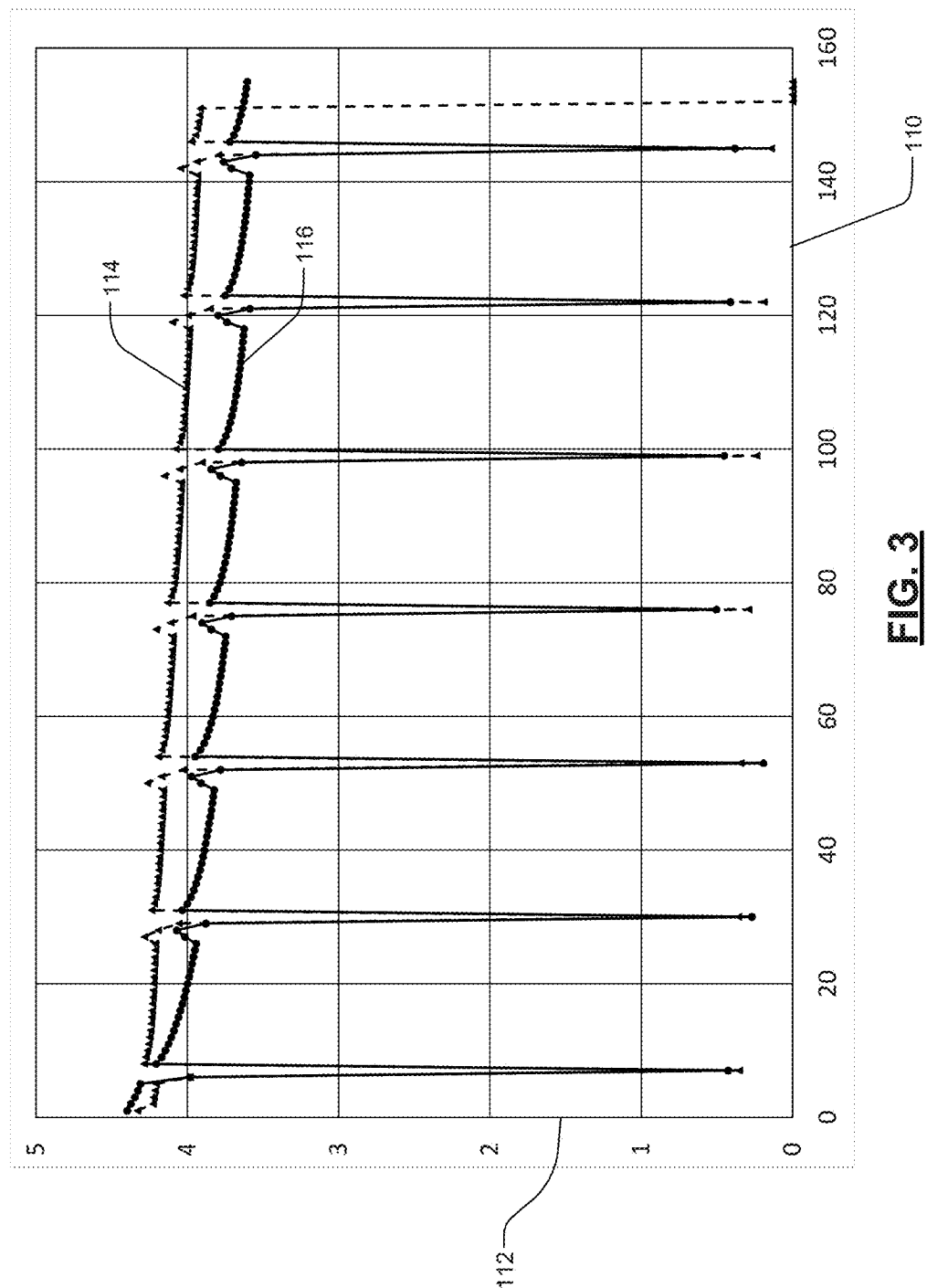
FIG. 3 is a graph depicting capacity over 150 cycles for an electrochemical cell including a lithium manganese iron phosphate (LMFP) positive electrode according to various aspects of the present disclosure and a comparative electrochemical cell including a nickel-manganese-cobalt 622 (NMC 622) positive electrode.

Referring to FIG. 3, a graph depicting capacity of the first and second electrochemical cells over 150 cycles according to various aspects of the present disclosure is provided. An x-axis 110 represents cycle and a y-axis 112 represents area capacity in mAh/cm$^2$. A first curve 114 represents capacity of the first electrochemical cell. A second curve 116 represents capacity of the second electrochemical cell. After about five cycles, the first electrochemical cell generally has a higher capacity than the second electrochemical cell at each cycle, indicating that the phospho-olivine electroactive material has a better capacity stability than the nickel-based electroactive materials.

Example 2

Resistance with LMFP Electrode

Two electrochemical cells are prepared. A first electrochemical cell includes a first positive electrode, a first negative electrode, and a first binder. The first positive electrode includes a phospho-olivine electroactive material. The first positive electrode includes 95 weight percent of LMFP as a phospho-olivine electroactive material, 2.5 weight percent amorphous nano-carbon (C45) as a conductive additive, and 2.5 weight percent of PVDF as a binder. LMFP has a lithium diffusivity of 10$^{15}$ cm/s and an electrical conductivity of 10$^{13}$ S/cm. The first positive electrode has a loading of about 4.5 mAh/cm$^2$. The first negative electrode includes lithium metal and defines a thickness of 30 μm. The first electrolyte includes 1.2 M LiPF$_6$ in FEC/DMC solvent (1:4 volume ratio).

A second or comparative electrochemical cell includes a second positive electrode, a second negative electrode, and a second electrolyte. The second positive electrode includes a nickel-based electroactive material. The second positive electrode includes 96 weight percent NMC 622 as the nickel-based electroactive material, 2 weight percent amorphous nano-carbon (C45) as a conductive additive, and 2 weight percent of PVDF as a binder. NMC 622 has a lithium diffusivity of 10$^{-9}$ cm/S and an electrical conductivity of 10$^{-3}$ S/cm. The second positive electrode has a loading of about 4.5 mAh/cm$^2$. The second negative electrode includes 30 μm-thick lithium metal. The second electrolyte includes 1.2M LiPF$_6$ in FEC/DMC (1:4 volume ratio).

With reference to FIG. 3A, a graph depicting area specific resistance as a function of state of charge for the positive electrodes of the first and second electrochemical cells according to various aspects of the present disclosure is provided. An x-axis 130 represents state of charge (SOC) in % and a y-axis 132 represents area-specific resistance in Ω/cm$^2$. A first curve 134 depicts resistance of the positive electrode including LMFP of the first electrochemical cell. A second curve 136 depicts resistance of the positive electrode including NMC 622 of the second electrochemical cell. The first curve 134 is generally higher than the second curve 136, indicating that LMFP has a higher resistance than NMC 622. Moreover, the first curve 134 has dramatic increase in resistance up to a maximum area-specific resistance 134 of about 66 Ω/cm$^2$ at about a 30% SOC.

Figure 4A:
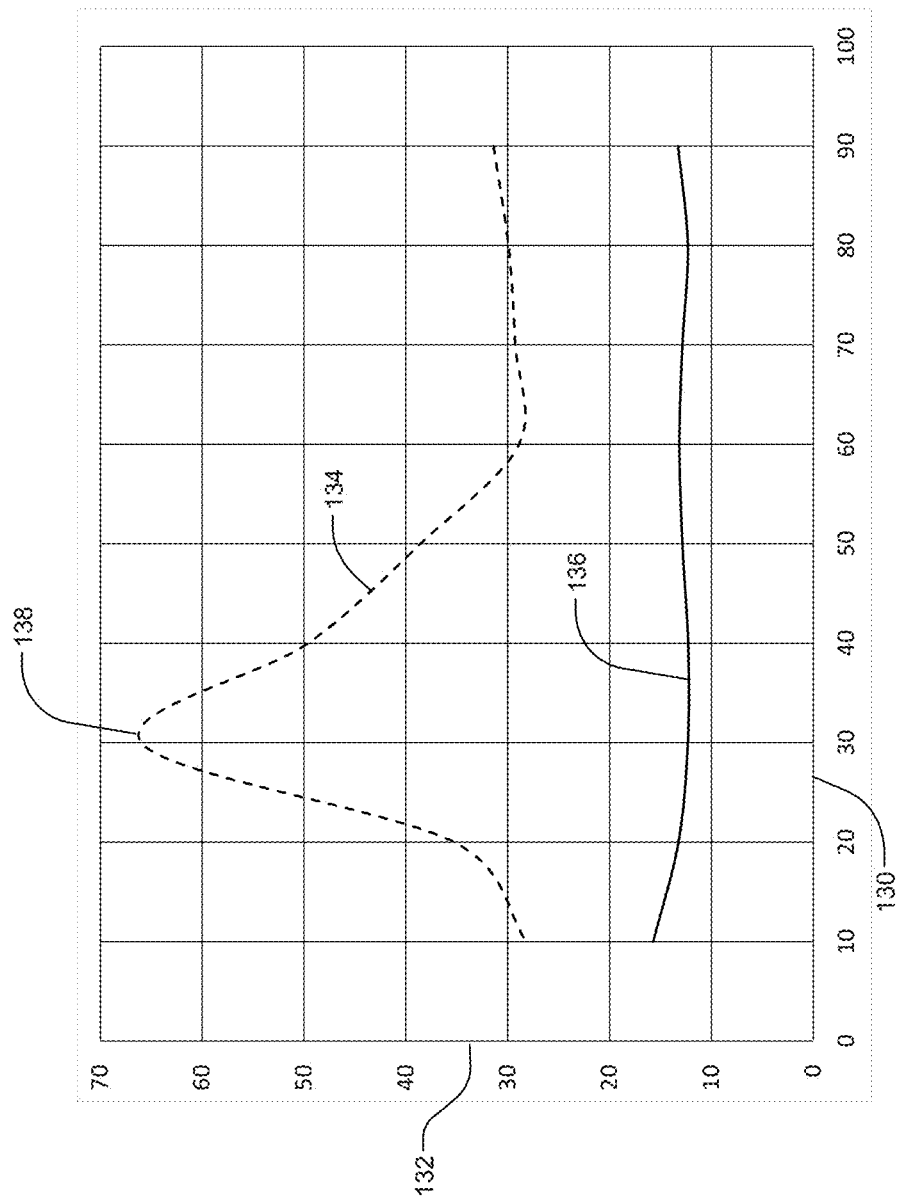
FIGS. 4A-4C relate to resistance of phospho-olivine-based positive electrodes and nickel-based positive electrodes according to various aspects of the present disclosure.
Figure 4B:
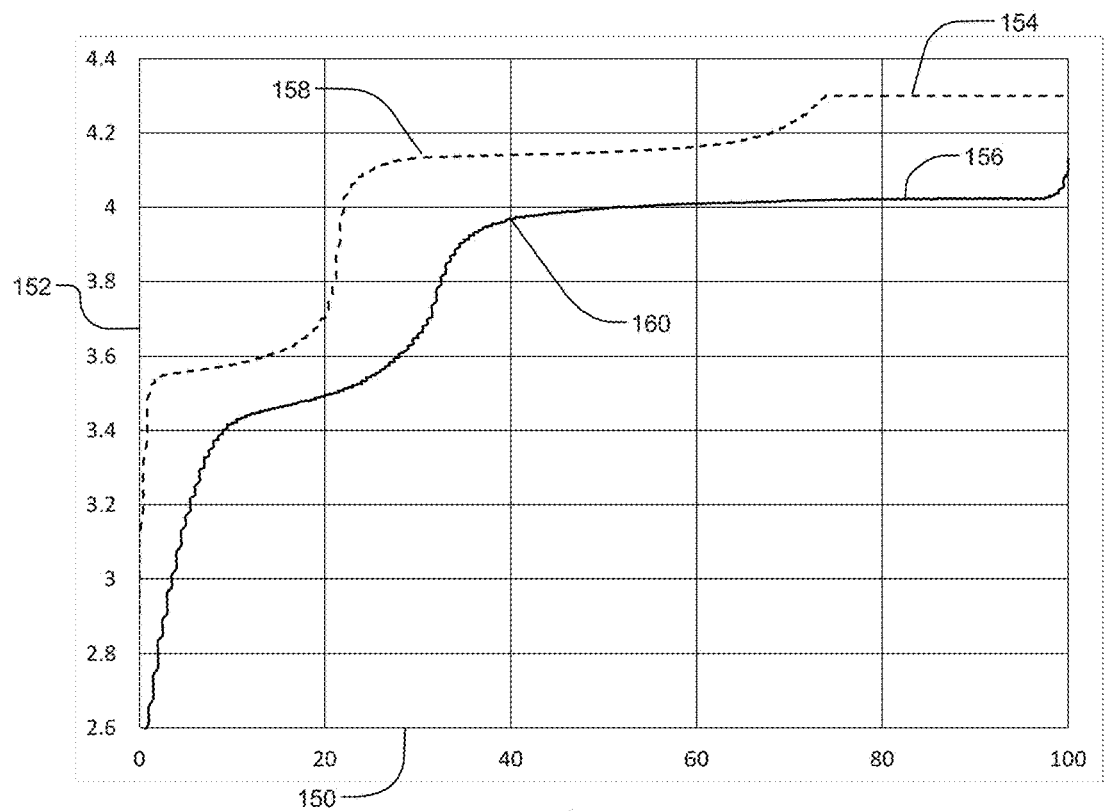

With reference to FIG. 4B, a graph depicting charge and discharge voltage profiles for the first electrochemical cell having the LMFP positive electrode according to various aspects of the present disclosure is provided. An x-axis 150 represents SOC in % and a y-axis 152 represents voltage in V. The first electrochemical cell is cycled within a voltage window of 2.5-4.3V at a charge rate (C-rate) of 0.5C. A charge curve is shown at 154. As indicated at 158, the charge curve 154 flattens at about 4.1V and about a 30% SOC. A discharge curve is shown at 156. As indicated at 160, the discharge curve 156 flattens at about 4.0 V and a SOC of about 40%.

Figure 4C:
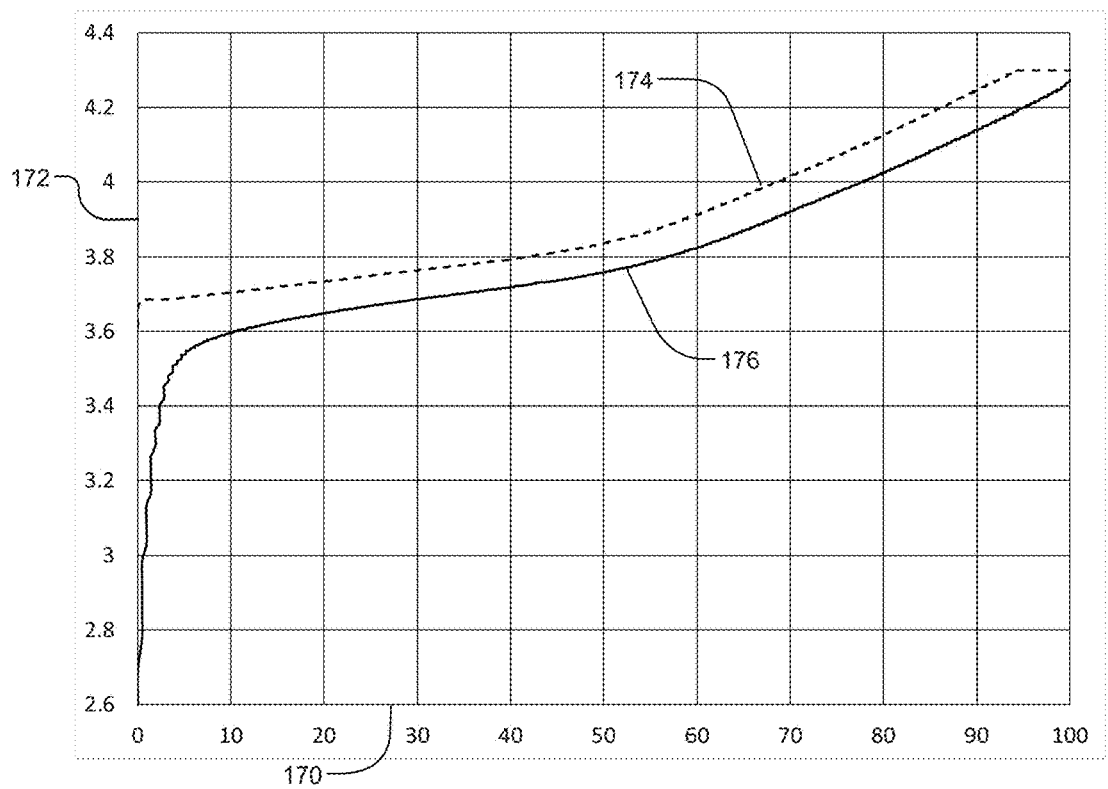

Referring to FIG. 4C, a graph depicting charge and discharge voltage profiles for the second electrochemical cell having the NMC 622 positive electrode according to various aspects of the present disclosure is provided. An x-axis 170 represents SOC in % and a y-axis 172 represents voltage in V. The second electrochemical cell is cycled within a voltage window of 2.5-4.3V and a C-rate of 0.5C. A charge curve is depicted at 174. A discharge curve is depicted at 176. Both of the charge and discharge curves 174, 176 generally increase as SOC increases.

LMFP has a higher sensitivity to resistance than NMC 622. Efficiency and thermal stability are generally higher with lower resistances. In certain aspects, electrolyte composition and concentration may also affect efficiency and thermal stability. Therefore, a different electrolyte may be selected for an electrochemical cell including a phospho-olivine-based positive electrode (e.g., LMFP) compared to an electrochemical cell including a nickel-based positive electrode (e.g., NMC 622).

Example 3

LiFSI-Based Electrolyte

Figure 5A:
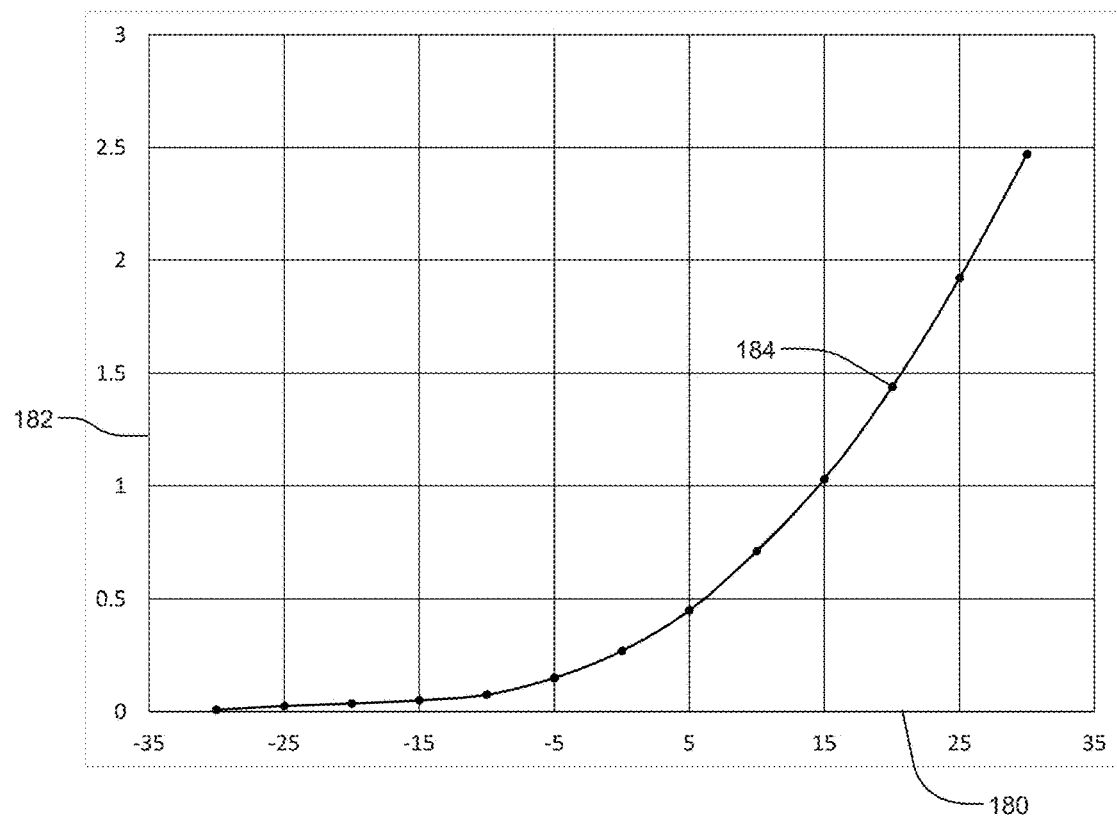
FIGS. 5A-5C relate to characteristics and performance of a 4M LiFSI in dimethyl ether (DME) electrolyte according to various aspects of the present disclosure.

With reference to FIG. 5A, a graph of conductivity as a function of temperature for an electrolyte including 4M LiFSI in DME solvent according to various aspects of the present disclosure is provided. An x-axis 180 represents temperature in ° C. and a y-axis 182 represents conductivity in mS. As indicated at 184, conductivity is only about 1.5 mS at 20° C.

Two electrochemical cells are prepared. Each electrochemical cell includes a 20 μm-thick lithium metal negative electrode. Each electrochemical cell includes 20 μL of an electrolyte include 4M LiFSI in DME solvent. A first electrochemical cell includes a positive electrode having an LMFP electroactive material and 4.5 mAh/cm$^2$ loading. A second or comparative electrochemical cell includes a positive electrode having an NMC 622 electroactive material and 4.5 mAh/cm² loading. Except for different electroactive materials, the positive electrodes are the same.

Figure 5B:
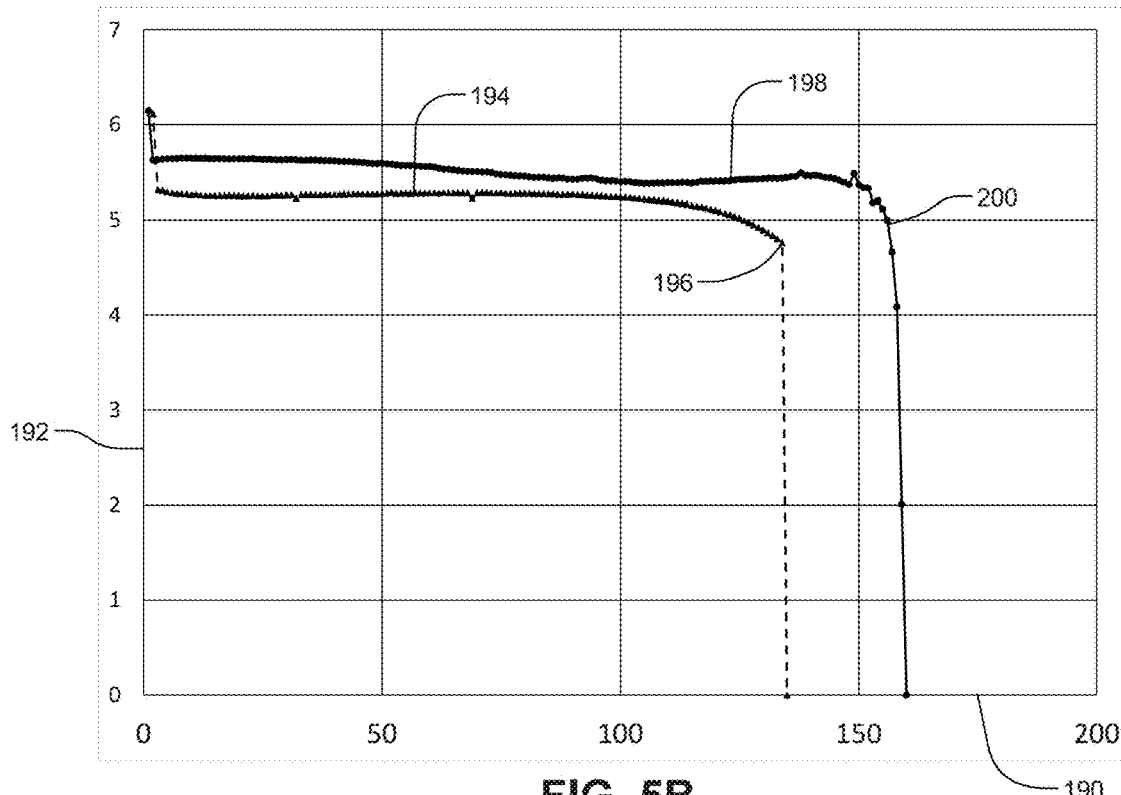

With reference to FIG. 5B, a graph depicting capacity of the first and second electrochemical cells according to various aspects of the present disclosure is provided. An x-axis 190 represents cycle and a y-axis 192 represents capacity in mAh. A first curve 194 depicts capacity of the first electrochemical cell. The first electrochemical cell experiences significant capacity fade at about 135 cycles, as shown at 196. A second curve 198 depicts capacity of the second electrochemical cell. The second curve 198 is generally higher than the first curve 194 due to a higher-conductivity positive electrode material. Moreover, the second electrochemical cell has a longer cycle life, experiencing significant capacity fade after about 160 cycles, as shown at 200.

Figure 5C:
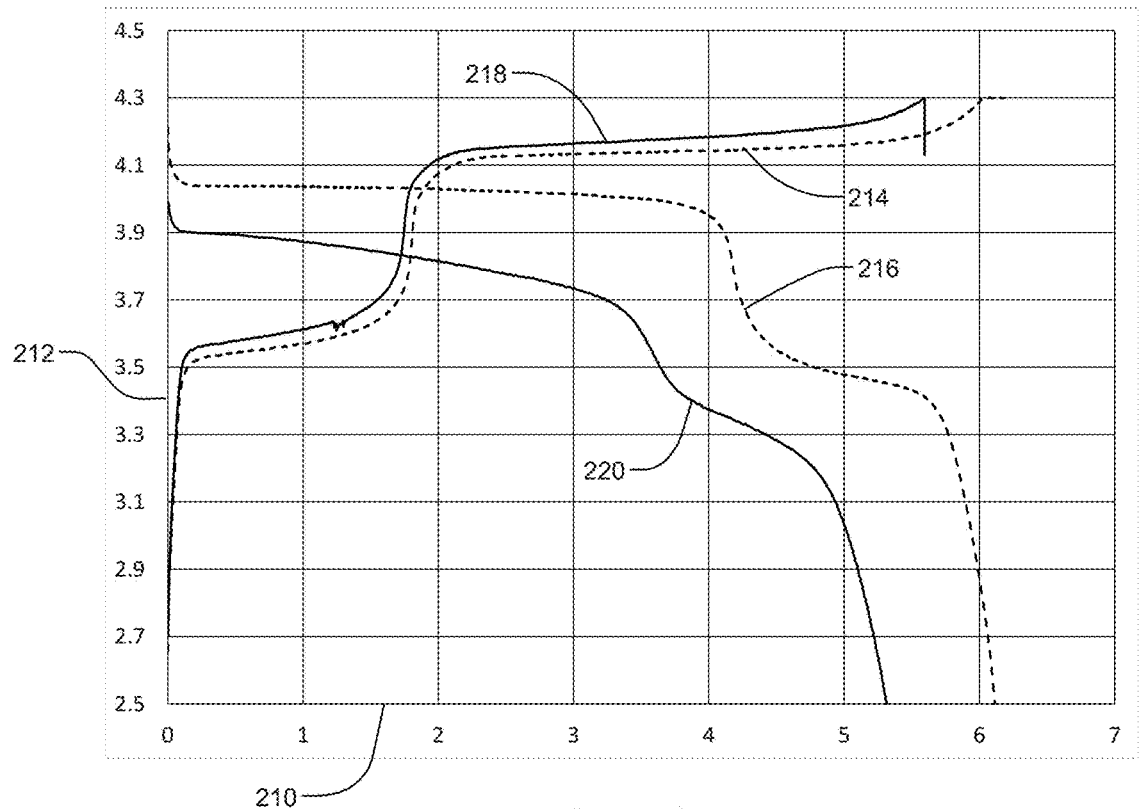

Referring to FIG. 5C, a graph depicting charge and discharge voltage profiles for the first electrochemical cell including the LMFP positive electrode according to various aspects of the present disclosure is provided. An x-axis 210 represents capacity in mAh and a y-axis 212 represents voltage in V. The first electrochemical cell is cycled in a voltage window of 2.5-4.3V at various C-rates. A first curve 214 illustrates a charge voltage profile at a C-rate of 0.1C. At 0.1C, the first electrochemical cell including the LMFP positive electrode delivers a capacity of about 6.3 mAh. A second curve 216 illustrates a discharge voltage profile at a C-rate of 0.1C. A third curve 218 illustrates a charge voltage profile at a C-rate of 0.5C. At 0.5C, the first electrochemical cell delivers a capacity of about 5.2 mAh. A fourth curve 220 illustrates a discharge voltage profile at a C-rate of 0.5C. The first electrochemical cell therefore has a 82.5% (5.2 mAh/6.3 mAh) capacity reversibility under these different C-rates, which is believed to be related to the coupling of relatively low conductivity 4M LiFSI in DME electrolyte and relatively low conductivity LMFE positive electrode.

Figure 5D:
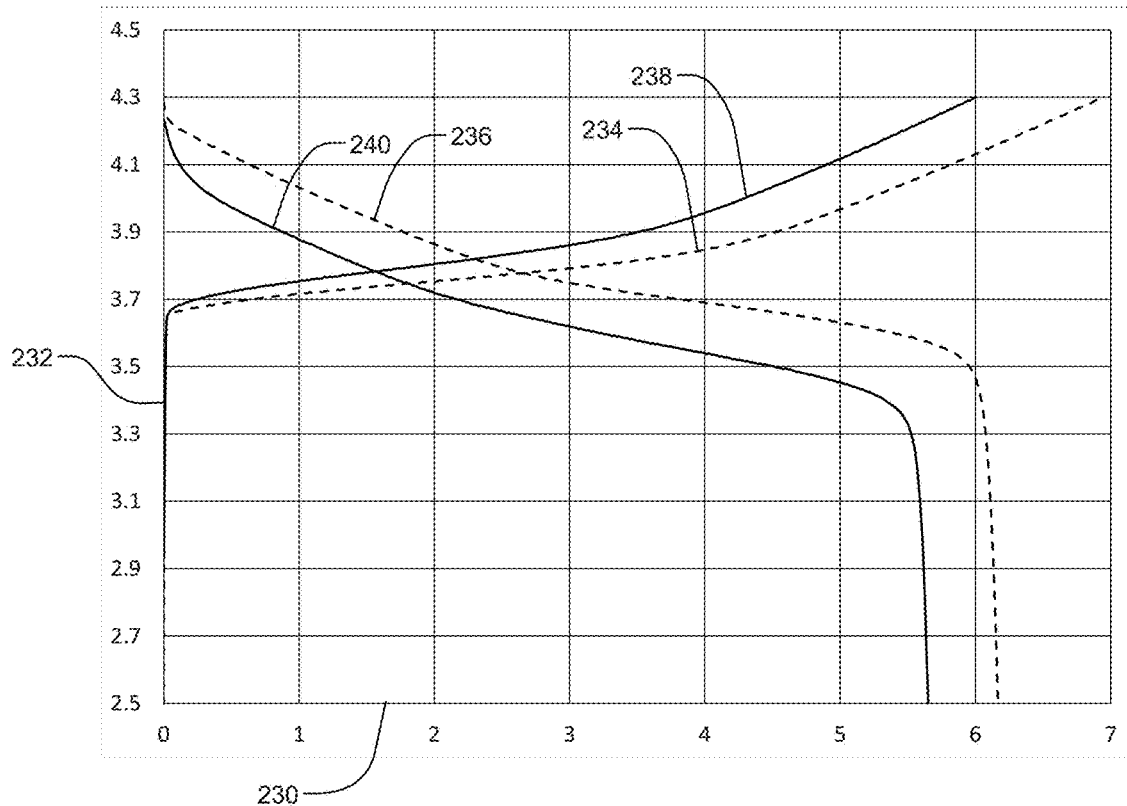
FIG. 5D is a graph depicting an electrochemical cell including an NMC 622-based positive electrode, a lithium metal negative electrode, and the electrolyte.

With reference to FIG. 5D, a graph depicting charge and discharge voltage profiles for the second electrochemical cell including the NMC 622 positive electrode according to various aspects of the present disclosure is provided. An x-axis 230 represents capacity in mAh and a y-axis 232 represents voltage in V. The second electrochemical cell is cycled in a voltage window of 2.5-4.3V at various C-rates. A first curve 234 illustrates a charge voltage profile at a C-rate of 0.1C. The second electrochemical cell with the NMC 622 positive electrode delivers capacity of about 6.2 mAh at 0.1C. A second curve 236 illustrates a discharge voltage profile at a C-rate of 0.1C. A third curve 238 illustrates a charge voltage profile at a C-rate of 0.5C. The second electrochemical cell delivers a specific capacity of about 5.6 mAh capacity at 0.5C. A fourth curve 240 illustrates a discharge voltage profile at a C-rate of 0.5C. The second electrochemical cell therefore has a 92% capacity reversibility (5.6 mAh/6.2 mAh) under these different current rates, which is believed to be related to the relatively high conductivity of NMC 622, even coupled with the relatively low conductivity 4M LiFSI in DME electrolyte.

Example 4

$LiPF_6$ Electrolyte

Figure 6A:
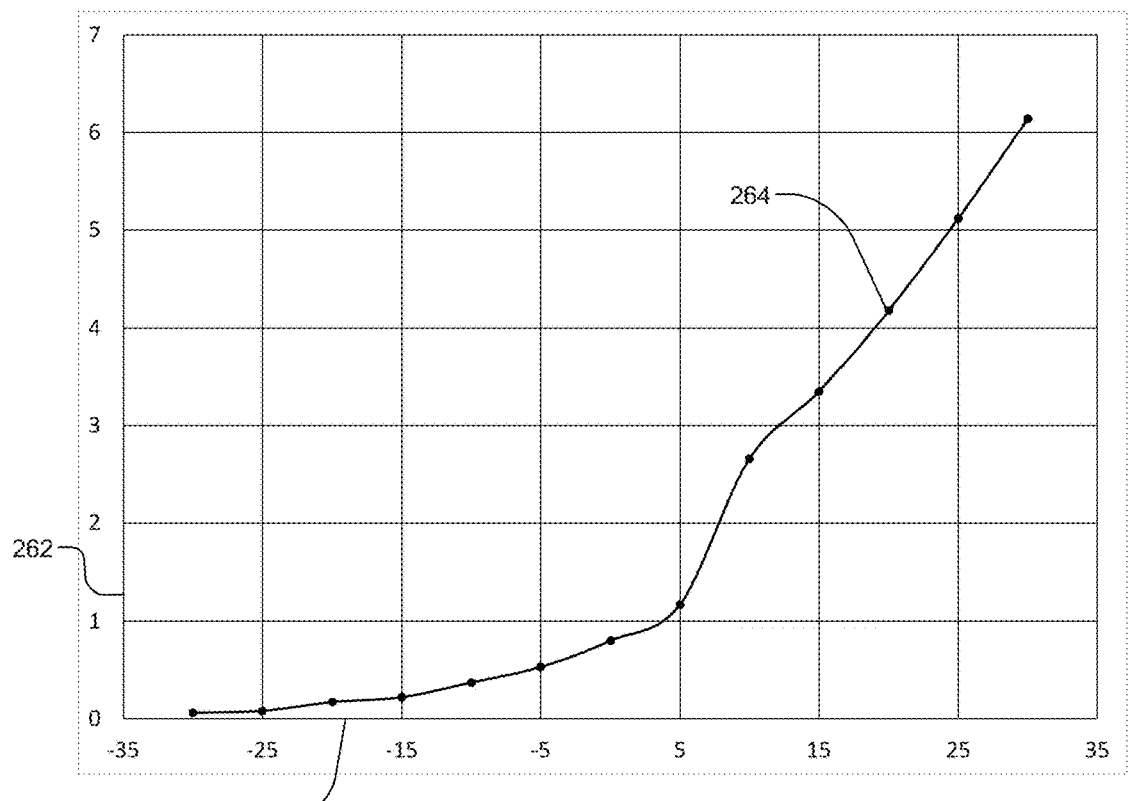
FIGS. 6A-6D relate to characteristics and performance of a 1.2M $LiPF_6$ in FEC/DME (1:4 V:V) electrolyte according to various aspects of the present disclosure.

With reference to FIG. 6A a graph of conductivity as a function of temperature for an electrolyte including 1.2M $LiPF_6$ in FEC/DMC solvent (1:4 volume ratio) according to various aspects of the present disclosure is provided. An x-axis 260 represents temperature in ° C. and a y-axis 262 represents conductivity in mS. As indicated at 264, conductivity is about 4.2 mS at 20° C.

Two electrochemical cells are prepared. Each electrochemical cell includes a lithium metal negative electrode. Each electrochemical cell includes 30 µL of an electrolyte include 1.2 M $LiPF_6$ in a FEC/DMC solvent (1:4 volume ratio). A first electrochemical cell includes a positive electrode having an LMFP electroactive material and 4.5 mAh/cm² loading. A second or comparative electrochemical cell includes a positive electrode having an NMC 622 electroactive material and 4.5 mAh/cm² loading.

Figure 6B:
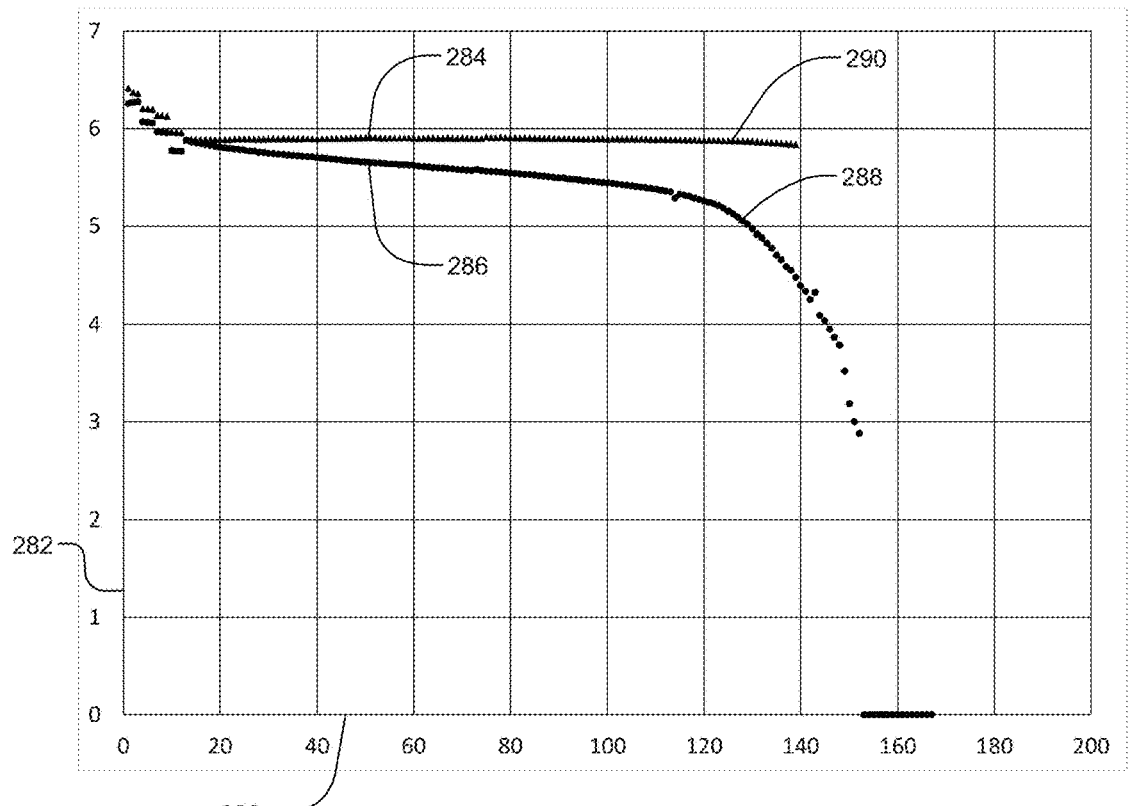

With reference to FIG. 6B, a graph depicting capacity of the first and second electrochemical cells according to various aspects of the present disclosure is provided. An x-axis 280 represents cycle and a y-axis 282 represents capacity in mAh. A first curve 284 depicts capacity of the first electrochemical cell. A second curve 286 depicts capacity of the second electrochemical cell. The first curve 284 is generally higher than the second curve 286. The second electrochemical cell experiences significant capacity fade after about 130 cycles, as shown at 288. In contrast, as shown at 290, the first electrochemical cell substantially retains its capacity after 130 cycles, indicating good capacity performance in the higher-conductivity $LiPF_6$-based electrolyte.

Figure 6C:
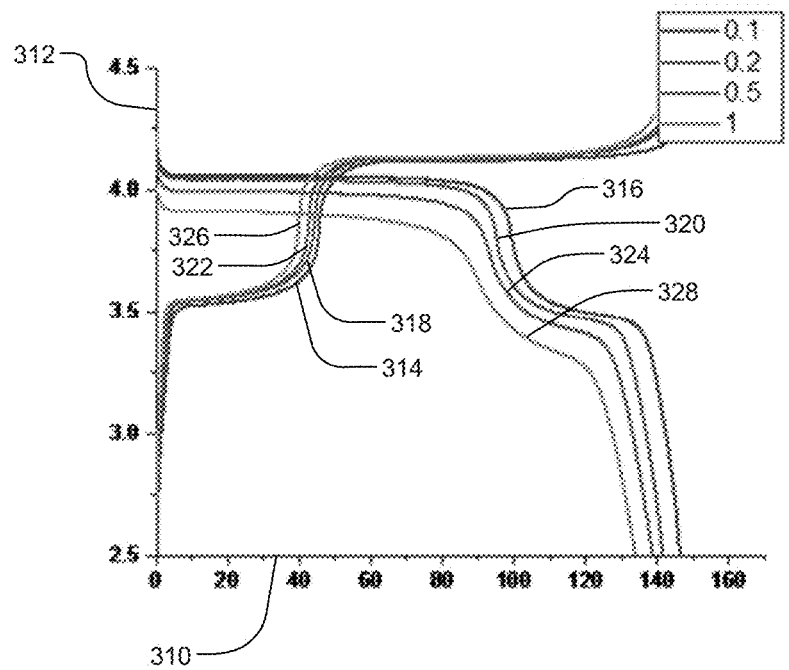

Referring to FIG. 6C, a graph depicting charge and discharge voltage profiles for the first electrochemical cell including the LMFP positive electrode according to various aspects of the present disclosure is provided. An x-axis 310 represents capacity in mAh/g and a y-axis 312 represents voltage in V. The first electrochemical cell is cycled in a voltage window of 2.5-4.3V at various C-rates. A first curve 314 illustrates a charge voltage profile at a C-rate of 0.1C. The first electrochemical cell delivers a specific capacity of about 155 mAh/g at 0.1C. A second curve 316 illustrates a discharge voltage profile at a C-rate of 0.1C. A third curve 318 illustrates a charge voltage profile at a C-rate of 0.2C. The first electrochemical cell delivers a specific capacity of about 142 mAh/g at 0.2C. A fourth curve 320 illustrates a discharge voltage profile at a C-rate of 0.2C. A fifth curve 322 illustrates a charge voltage profile at a C-rate of 0.5C. The first electrochemical cell delivers a specific capacity of about 138 mAh/g at 0.5C. A sixth curve 324 illustrates a discharge voltage profile at a C-rate of 0.5C. A seventh curve 326 illustrates a charge voltage profile at a C-rate of 1C. The first electrochemical cell delivers a specific capacity of about 135 mAh/g at 1C. An eighth curve 328 illustrates a discharge voltage profile at a C-rate of 1C.

Figure 6D:
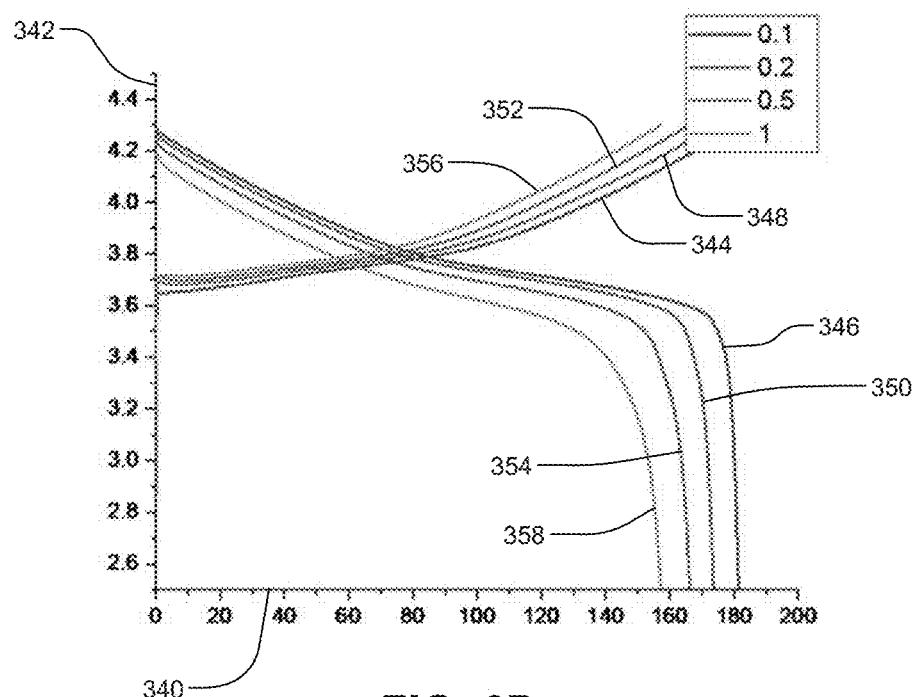

With reference to FIG. 6D, a graph depicting charge and discharge voltage profiles for the first electrochemical cell including the NMC 622 positive electrode according to various aspects of the present disclosure is provided. An x-axis 340 represents capacity in mAh/g and a y-axis 342 represents voltage in V. The second electrochemical cell is cycled in a voltage window of 2.5-4.3V at various C-rates. A first curve 344 illustrates a charge voltage profile at a C-rate of 0.1C. The second electrochemical cell delivers a specific capacity of about 180 mAh/g at 0.1C. A second curve 346 illustrates a discharge voltage profile at a C-rate of 0.1C. A third curve 348 illustrates a charge voltage profile at a C-rate of 0.2C. The second electrochemical cell delivers a capacity of about 177 mAh/g at 0.2C. A fourth curve 350 illustrates a discharge voltage profile at a C-rate of 0.2C. A fifth curve 352 illustrates a charge voltage profile at a C-rate of 0.5C. The second electrochemical cell delivers a capacity of about 168 mAh/g at 0.5C. A sixth curve 354 illustrates a discharge voltage profile at a C-rate of 0.5C. A seventh curve 356 illustrates a charge voltage profile at a C-rate of 1C. The second electrochemical cell delivers a specific capacity of about 158 mAh/g at 1C. An eighth curve 358 illustrates a discharge voltage profile at a C-rate of 1C.

The first electrochemical cell including the LMFP positive electrode and the relatively high conductivity 1.2M LiPF$_6$ in FEC/DMC electrolyte has a capacity reversibility of 89% between 0.5C and 0.1C (138 mAh/g/155 mAh/g). Accordingly, first electrochemical cell including LMFP positive electrode and the 1.2M LiPF$_6$ in FEC/DMC electrolyte performs better in terms of capacity reversibility compared to the first electrochemical cell of Example 4, which includes the relatively low conductivity 4M LiFSI in DME electrolyte. In contrast, capacity reversibility of the second electrochemical cell including the NMC 622 positive electrode in the LiPF$_6$ in FEC/DMC performs similarly in terms of capacity reversibility compared to the second electrochemical cell of Example 4, which includes the relatively low conductivity 4M LiFSI in DME electrolyte.

Example 6

Harvest Lithium Metal Morphology

Harvest lithium metal morphology is used to evaluate the stability of a lithium metal anode in different electrolytes. Four LMFP/lithium metal half-cells are prepared according to various aspects of the present disclosure. A first or comparative half-cell is free of an electrolyte. A second half-cell includes a 1M LiFSI in FEC/DMC solvent (1:4 volume ratio) electrolyte. A third half-cell includes a 1M LiPF$_6$ in FEC/DMC solvent (1:4 volume ratio) electrolyte. A fourth half-cell includes a LiClO$_4$ in FEC/DMC solvent (1:4 volume ratio) electrolyte. The first half-cell is not cycled. The second, third, and fourth half-cells are cycled at 0.1C for charge and discharge within a 2.5-4.3V voltage window for three cycles.

With reference to FIG. 7A, a sectional view of a pristine lithium metal negative electrode 370 of the first half-cell according to various aspects of the present disclosure is provided. The negative electrode 370 defines a thickness 372 of about 20 μm.

Referring to FIG. 7B, a sectional view of a lithium metal negative electrode 380 of the second half-cell according to various aspects of the present disclosure is provided. The negative electrode 380 defines a thickness 382 of about 80 μm. The negative electrode 380 defines a plurality of pores 384.

With reference to FIG. 7C, a sectional view of a lithium metal negative electrode 390 of the third half-cell according to various aspects of the present disclosure is provided. The negative electrode 390 defines a thickness 392 of 50 μm. The negative electrode 390 defines a plurality of pores 394. The electrode 390 having the LiClO$_4$ electrolyte is generally thinner and less porous than both the pristine electrode 370 of FIG. 7A and the electrode 380 corresponding to the LiFSI electrolyte of FIG. 7B after cycling.

Referring to FIG. 7D, a sectional view of a lithium metal negative electrode 400 of the fourth half-cell according to various aspects of the present disclosure is provided. The negative electrode 400 defines a thickness 402 of 30 μm. The electrode 400 having the LiClO$_4$ electrolyte is generally thinner and less porous than the pristine electrode 370 of FIG. 7A, the electrode 380 corresponding to the LiFSI electrolyte of FIG. 7B, and the electrode 390 corresponding to the LiPF$_6$ electrolyte of FIG. 7C after cycling.

A higher thickness and porosity of a lithium metal negative electrode after cycling generally indicates a greater lithium expenditure during cycling. Therefore, a system in which a negative electrode has a large increase in thickness and/or porosity after cycling may have a lower lithium metal stability than a system in which a lithium metal negative electrode has a smaller increase in thickness and/or porosity. Accordingly, an electrolyte including a LiClO$_4$ electrolyte salt may have a greater stability against a lithium metal electrode than an electrolyte including only LiPF$_6$ or only LiFSI salt.

Example 7

First Cycle Coulombic Efficiency

First cycle Coulombic efficiency is used to evaluate lithium metal negative electrode stability. A higher first cycle Coulombic efficiency generally indicates that less lithium is consumed to form a SEI layer.

Figure 8:
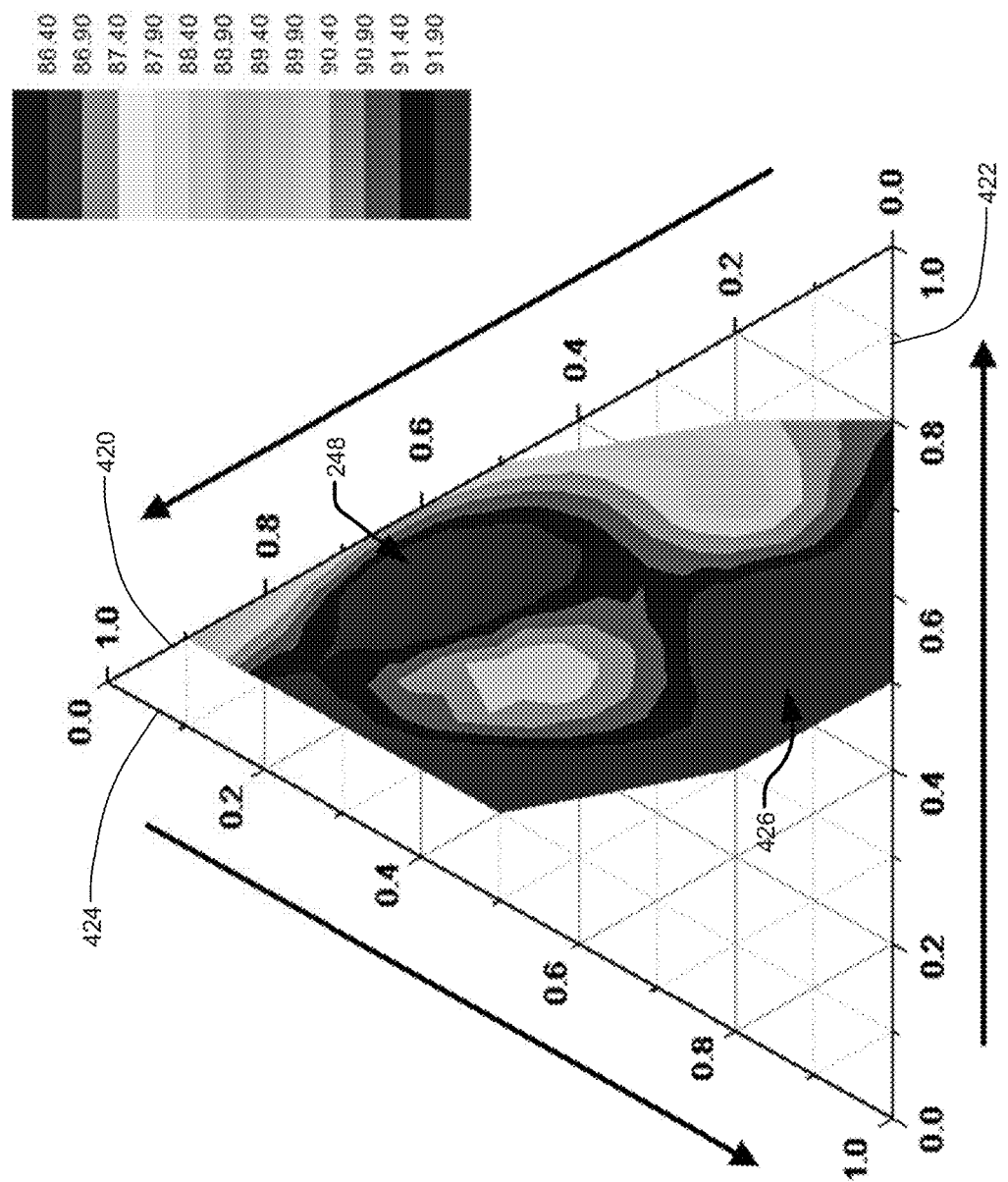
FIG. 8 is a graphical representation of first cycle Coulombic efficiency of a ternary salts electrolyte system according to various aspects of the present disclosure.

FIG. 8 depicts first cycle Coulombic efficiency for a ternary salts electrolyte system in LMFO/lithium metal half-cells according to various aspects of the present disclosure. The ternary salts electrolyte system includes LiFSI, LiPF$_6$, and LiClO$_4$ as salts in a FEC/DMC (1:4 volume ratio) solvent. A first axis 420 represents LiFSI mole percent. A second axis 422 represents LiPF$_6$ mole percent. A third axis 424 represents LiClO$_4$ mole percent.

A first region 426 and a second region 428 correspond to a highest range of Coulombic efficiency of greater than or equal to 91.9% to less than or equal to about 92%. The second region 428 generally includes a lower amount of LiClO$_4$, a higher amount of LiPF$_6$, and a higher amount of LiFSI than the first region 426. In certain aspects, a composition a ternary salts electrolyte may be selected to be in the first region 426 corresponding to the lower amount of LiClO$_4$.

Example 8

Conductivity

Figure 9A:
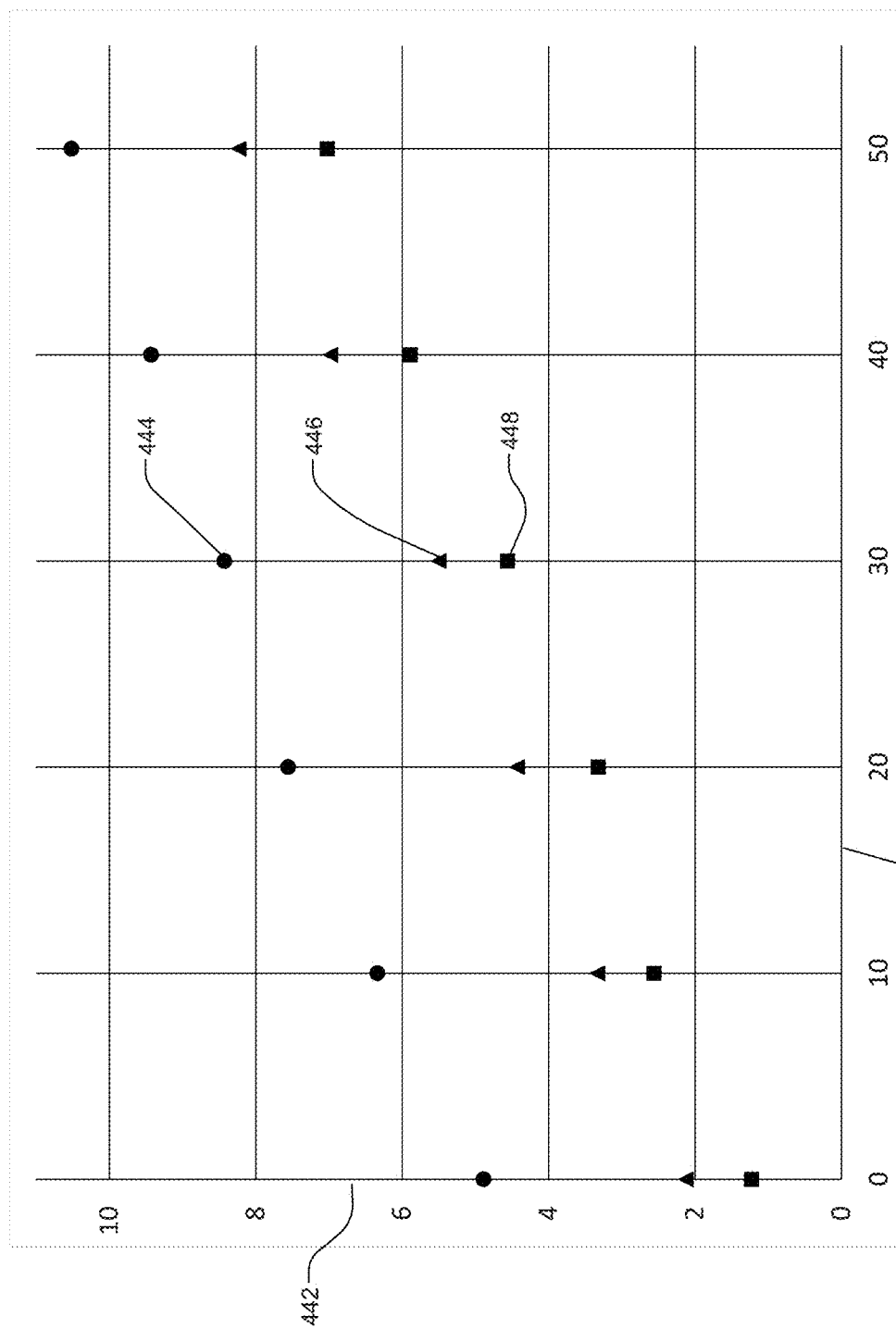
FIGS. 9A-9B relate to conductivity of a ternary salts electrolyte according to various aspects of the present disclosure.

With reference to FIG. 9A, a graph depicting conductivity as a function of temperature for three electrolytes according to various aspects of the present disclosure is provided. An x-axis 440 represents temperature in ° C. and a y-axis 442 represents conductivity in S/m. A first data set 444 depicts conductivity of a first electrolyte including 1M LiFSI in FEC/DMC at a 1:4 volume ratio. A second data set 446 depicts conductivity of a second electrolyte including 1M LiPF$_6$ in FEC/DMC at a 1:4 volume ratio. A third data set 448 depicts conductivity of a third electrolyte including 1M LiClO$_4$ in FEC/DMC at a 1:4 volume ratio.

Figure 9B:
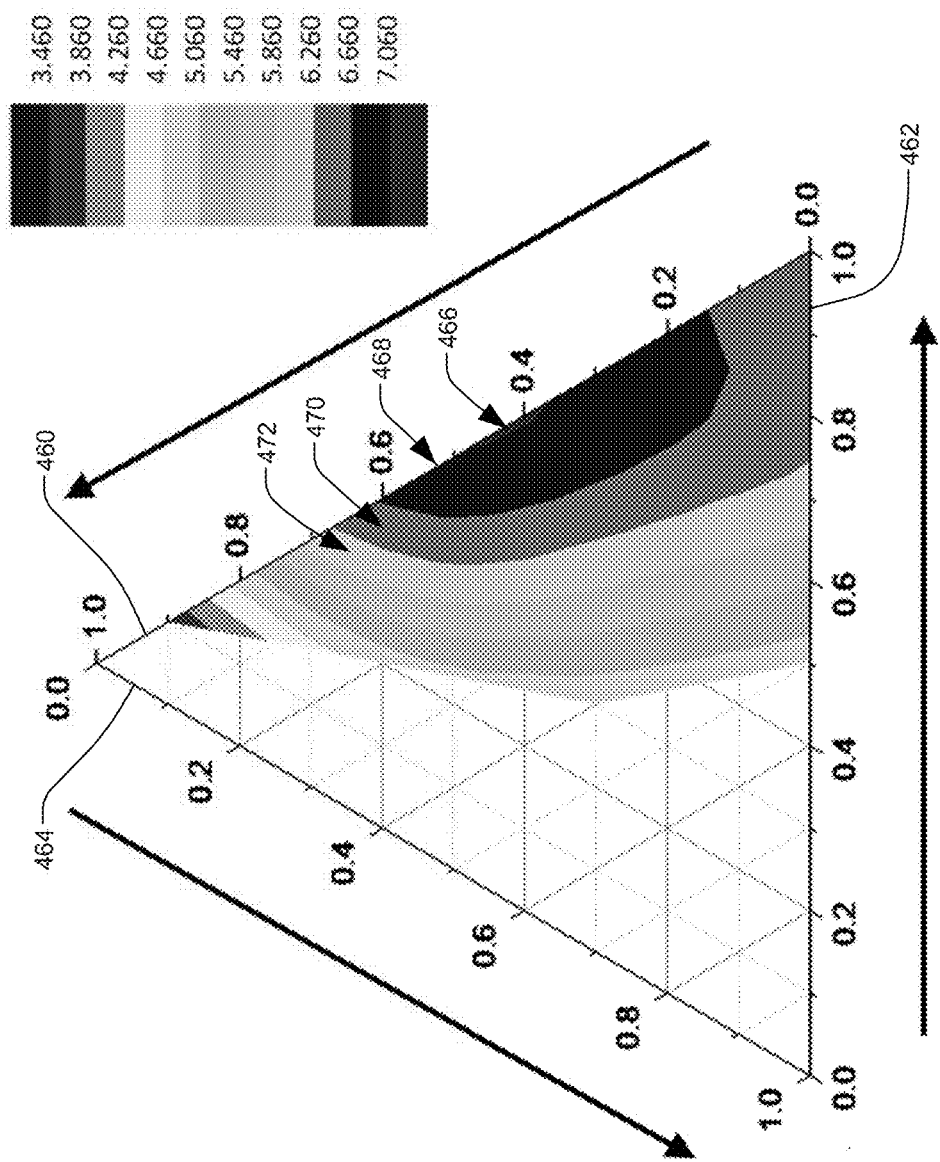

Referring to FIG. 9B, conductivity for a ternary salts electrolyte system according to various aspects of the present disclosure is provided. A first axis 460 represents LiFSI mole percent. A second axis 462 represents LiPF$_6$ mole percent. A third axis 464 represents LiClO$_4$ mole percent. A first region 466 corresponds to a conductivity of greater than or equal 7.06 S/m. A second region 468 corresponds to a conductivity of greater than or equal to 6.6 S/m to less than 7.06 S/m. A third region 470 corresponds to a conductivity of greater than or equal to 6.26 S/m to less than 6.6 S/m. A fourth region 472 corresponds to a conductivity of greater than or equal to 5.86 S/m to less than 6.26 S/m.

Example conductivities for different mole ratios of the salts in the ternary salts electrolyte are shown below in Table 2. In general high conductivity of the ternary salt system may be achieved with higher mole ratios of LiPF$_6$ and LiFSI and a lower ratio of LiClO$_4$.

TABLE 2

| LiPF$_6$ | LiFSI | LiClO$_4$ | Conductivity (10$^{-3}$ S/cm) |
|---|---|---|---|
| 10 | 0 | 0 | 7.06 |
| 5 | 5 | 0 | 6.26 |
| 3 | 7 | 0 | 6.08 |
| 5 | 3 | 2 | 6.25 |
| 4 | 3 | 3 | 5.55 |
| 3 | 3 | 4 | 4.77 |

Example 9

Electrochemical Performance

An electrochemical cell including a ternary salts electrolyte according to various aspects of the present disclosure is prepared. A solvent includes FEC and DMC at a 1:4 volume ratio FEC:DMC. The ternary salts electrolyte includes 0.5M LiFSI, 0.3M LiPF$_6$, and 0.2M LiClO$_4$ in the solvent. A positive electrode includes 95 weight percent of LMFP as an electroactive material, 2.5 weight percent of PVDF as a binder, and 2.5 weight percent of amorphous carbon (C45) as a conductive additive. The positive electrode has a 4.5 mAh/cm$^2$ loading. A negative electrode includes 30 μm-thick lithium metal on an 8 μm-thick copper current collector The electrochemical cell includes 30 μL of the ternary salts electrolyte.

Figure 10:
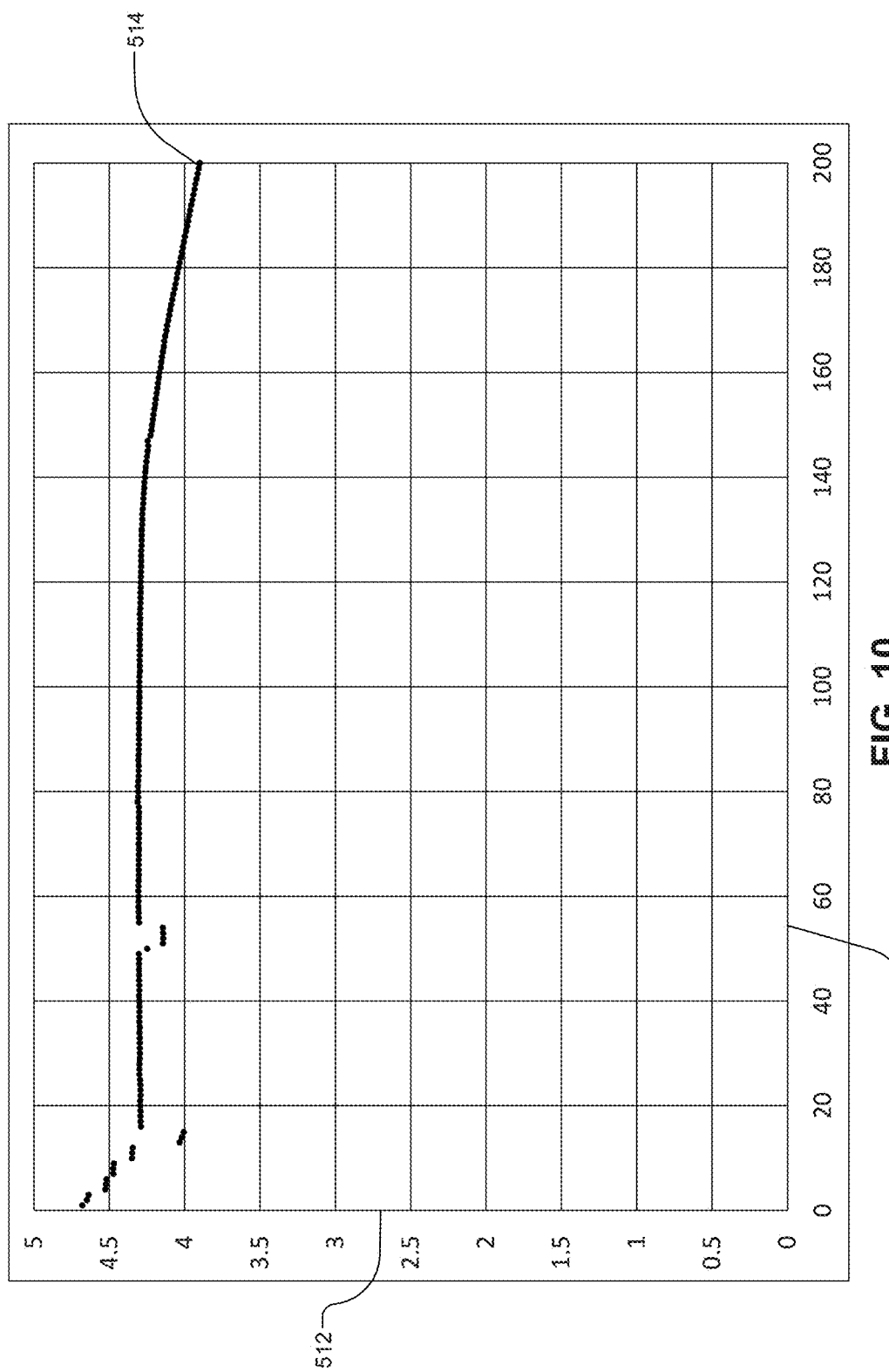
FIG. 10 is a graph depicting area capacity of an electrochemical cell including an LMFP positive electrode, a lithium metal negative electrode, and a ternary salts electrolyte according to various aspects of the present disclosure.

Referring to FIG. 10, a graph depicting area capacity of the electrochemical cell according to various aspects of the present disclosure is provided. An x-axis 510 represents cycle and a y-axis 512 represents area capacity in mAh/cm$^2$. The electrochemical cell substantially retains at capacity after at least about 200 cycles, as indicated at 514.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell comprising:
a positive electrode including a positive electroactive material comprising a phospho-olivine compound;
a negative electrode comprising lithium metal;
a separator between the positive electrode and the negative electrode, the separator being electrically insulating and ionically conductive; and
an electrolyte, the electrolyte comprising,
a ternary salt including LiPF$_6$, LiFSI, and LiClO$_4$, and
a solvent, wherein
a total molarity of the ternary salt in the solvent is greater than or equal to about 0.5M to less than or equal to about 2M,
a first molarity of the LiClO$_4$ in the solvent is greater than or equal to about 0.1 M to less than or equal to about 0.2M,
a second molarity of the LiPF$_6$ in the solvent is greater than or equal to about 0.1 M to less than or equal to about 1.4M, and
a third molarity of the LiFSI is greater than or equal to about 0.1 M to less than or equal to about 1.4M.

2. The electrochemical cell of claim 1, wherein the total molarity is greater than or equal to 0.8M to less than or equal to about 1.2M.

3. The electrochemical cell of claim 1, wherein a molarity of the LiClO$_4$ in the solvent is greater than or equal to about 0.15M to less than or equal to about 0.2M.

4. The electrochemical cell of claim 1, wherein a molarity of the LiPF$_6$ in the solvent is greater than or equal to about 0.1 M to less than or equal to about 0.5M.

5. The electrochemical cell of claim 1, wherein a molarity of the LiFSI is greater than or equal to about 0.3 M to less than or equal to about 0.7M.

6. The electrochemical cell of claim 1, wherein the solvent includes a fluorinated cyclic carbonate.

7. The electrochemical cell of claim 6, wherein the fluorinated cyclic carbonate is selected from the group consisting of: fluoroethylene carbonate (FEC), difluoroethylene carbonate (DFEC), trifluoropropylene carbonate (TFPC), or any combination thereof.

8. The electrochemical cell of claim 6, wherein the solvent further includes a linear carbonate.

9. The electrochemical cell of claim 8, wherein the linear carbonate is selected from the group consisting of: dimethyl carbonate (DMC), diethyl carbonate (DEC), ethyl methyl carbonate (EMC), or any combination thereof.

10. The electrochemical cell of claim 8, wherein the fluorinated cyclic carbonate includes fluoroethylene carbonate (FEC) and the linear carbonate includes dimethyl carbonate (DMC).

11. The electrochemical cell of claim 8, wherein the solvent includes the fluorinated cyclic carbonate and the linear carbonate at a volume ratio of greater than or equal to about 1:9 to less than or equal to about 9:1.

12. The electrochemical cell of claim 11, wherein the volume ratio is about 1:4 fluorinated cyclic carbonate to linear carbonate.

13. The electrochemical cell of claim 1, wherein the phospho-olivine compound has a form of Li-M$^1$-M$^2$-PO$_4$, where M$^1$ is a first transition metal and M$^2$ is a second transition metal.

14. The electrochemical cell of claim 13, wherein the phospho-olivine compound includes LMFP.

15. The electrochemical cell of claim 1, wherein the phospho-olivine compound is a first positive electroactive material and the positive electrode further includes a second electroactive material different from the first positive electroactive material.

16. The electrochemical cell of claim 15, wherein the second electroactive material is selected from the group consisting of: a rock salt layered oxide, a spinel, or both the rock salt layered oxide and the spinel.

17. The electrochemical cell of claim 1, wherein the positive electrode further includes an electrically-conductive material.

18. An electrolyte system comprising:
a solvent comprising,
a fluorinated cyclic carbonate, and
a linear carbonate; and a ternary salt in the solvent at a total molarity of greater than or equal to about 0.5M to less than or equal to about 2M, the ternary salt comprising,
    $LiClO_4$ at a first molarity of greater than or equal to about 0.1 M to less than or equal to about 0.2M,
    $LiPF_6$ at a second molarity of greater than or equal to about 0.1 M to less than or equal to about 1.4M, and
    LiFSI at a third molarity of greater than or equal to about 0.1 M to less than or equal to about 1.4M.

19. The electrochemical cell of claim 1, wherein the electrolyte consists essentially of the ternary salt and the solvent.

20. The electrolyte system of claim 18, wherein
the electrolyte consists essentially of the ternary salt and the solvent,
a molarity of the $LiClO_4$ in the solvent is greater than or equal to about 0.15M to less than or equal to about 0.2M,
a molarity of the $LiPF_6$ in the solvent is greater than or equal to about 0.1 M to less than or equal to about 0.5M, and
a molarity of the LiFSI is greater than or equal to about 0.3 M to less than or equal to about 0.7M.

\* \* \* \* \*